(12) United States Patent
Wing et al.

(10) Patent No.: US 12,373,772 B2
(45) Date of Patent: Jul. 29, 2025

(54) METHODS AND SYSTEMS FOR INVENTORY PLANNING AND CONTROL

(71) Applicant: Target Brands, Inc., Minneapolis, MN (US)

(72) Inventors: Joshua Wing, Minneapolis, MN (US); Molly S. Brown, Minneapolis, MN (US); Adnan Hasanbhai, Osseo, MN (US); Michael Staab, Minneapolis, MN (US); Aashimi Bhatia, Karnataka (IN); Shriram Prabhu, Karnataka (IN); Anshika Chaurasia, Karnataka (IN); Vignesh J, Karnataka (IN); Sayak Chowdhury, Karnataka (IN); Abhijith Neerkaje, Karnataka (IN); Manju Pandit, Karnataka (IN)

(73) Assignee: Target Brands, Inc., Minneapolis, MN (US)

( * ) Notice: Subject to any disclaimer, the term of this patent is extended or adjusted under 35 U.S.C. 154(b) by 228 days.

(21) Appl. No.: 17/715,756

(22) Filed: Apr. 7, 2022

(65) Prior Publication Data

US 2023/0325763 A1 Oct. 12, 2023

(51) Int. Cl.
*G06Q 10/087* (2023.01)
*G06Q 30/0204* (2023.01)
*G06Q 30/0601* (2023.01)

(52) U.S. Cl.
CPC ....... *G06Q 10/087* (2013.01); *G06Q 30/0205* (2013.01); *G06Q 30/0633* (2013.01)

(58) Field of Classification Search
CPC ............. G06Q 10/087; G06Q 30/0205; G06Q 30/0633
See application file for complete search history.

(56) References Cited

U.S. PATENT DOCUMENTS 5,615,109 A * 3/1997 Eder .................. G06Q 10/0631 705/7.12
5,953,707 A 9/1999 Huang et al.
(Continued)

FOREIGN PATENT DOCUMENTS

WO 2018083450 A2 5/2018
WO 2020264436 A1 12/2020

OTHER PUBLICATIONS

Oleson, "Forecast Inventory in Fathom", Sep. 2021 https://web.archive.org/web/20210924130113/https://support.fathomhq.com/en/articles/5485362-forecast-inventory-in-fathom (Year: 2021).*

(Continued)

*Primary Examiner* — Allen C Chein
(74) *Attorney, Agent, or Firm* — Merchant & Gould P.C.

(57) ABSTRACT

Methods and systems for visualizing an inventory management and control. One method comprises receiving and aggregating inventory data from a plurality of nodes of a retail enterprise, scheduling a plurality of purchase orders for at least one item type based on the inventory data, generating inventory projections for the at least one item type based on the inventory data and the plurality of purchase orders, and rendering on a display, as part of a visualization tool user interface, a graphical view representing the inventory projections for the at least one item type, wherein the graphical view automatically updates based on inputs received for adjusting at least one purchase order of the plurality of purchase orders and inputs received for selecting at least one node or at least one group of nodes from the plurality of nodes.

19 Claims, 27 Drawing Sheets

(56) References Cited

U.S. PATENT DOCUMENTS

| | | | |
|---|---|---|---|
| 7,249,068 | B1 | 7/2007 | Kakouros et al. |
| 7,904,350 | B2 | 3/2011 | Ayala et al. |
| 8,117,061 | B2 | 2/2012 | May et al. |
| 8,527,311 | B2 | 9/2013 | Chobantonov et al. |
| 8,589,263 | B2 | 11/2013 | Doenig et al. |
| 8,700,443 | B1 | 4/2014 | Murray et al. |
| 10,366,362 | B1 | 7/2019 | Reddy |
| 10,373,102 | B2 | 8/2019 | Deshpande et al. |
| 10,657,492 | B1 * | 5/2020 | Wei .................... G06Q 30/0635 |
| 11,023,855 | B1 | 6/2021 | Kramer et al. |
| 11,620,612 | B2 | 4/2023 | Ohlsson et al. |
| 2009/0259505 | A1 | 10/2009 | Tadayon |
| 2011/0145030 | A1 | 6/2011 | Allen |
| 2012/0303411 | A1 * | 11/2012 | Chen .................... G06Q 10/087 |
| | | | 705/7.31 |
| 2014/0310048 | A1 | 10/2014 | Murray et al. |
| 2014/0344118 | A1 | 11/2014 | Parpia et al. |
| 2018/0260779 | A1 | 9/2018 | Singh et al. |
| 2021/0110461 | A1 | 4/2021 | Wang |
| 2021/0334829 | A1 | 10/2021 | Drexl et al. |
| 2023/0169462 | A1 * | 6/2023 | Huang ............. G06Q 10/06315 |
| | | | 705/7.25 |
| 2023/0325769 | A1 | 10/2023 | Wing et al. |

OTHER PUBLICATIONS

"Supply Chain Apps", Mar. 2022, https://supplychainloghub.ingeteknia.com/wp-content/uploads/2022/03/Supply_Chain_Apps.pdf (Year: 2022).*

In view of Goehring, "Safety Stock Simulation and Reorder Point Determination with SAP's Add-On Tool", Dec. 2013, https://sap-supply-chain-ideas.blogspot.com/2013/12/safety-stock-simulation-and-reorder.html (Year: 2013).*

Saci, "Inventory Management for Retail—Deterministic Demand", Oct. 5, 2021, https://towardsdatascience.com/inventory-management-for-retail-deterministic-demand-311682c02518 (Year: 2021).*

"Operating Instructions VEGA Inventory System", 2019, available at https://www.vega.com/en-us/downloads (Year: 2019).*

Li et al, The Impact of Lead Time Uncertainty on Supply Chain Performance Considering Carbon Cost—(Sustainability), Dated: 2019, 19 Pages.

De Sensi et al., Inventory policies analysis under demand patterns and lead times constraints in a real supply chain (HAL archives ouvertes.fr), Dated: 2008, 31 Pages.

Puryani et al., A case study of supply chain simulation for determining the best stock allocation (Department of Industrial Engineering, Pembangunan Nasional "Veteran" University, Yogyakarta, Indonesia), Dated: 2018, 5 Pages.

Du, Donglei, Supply Chain Management: Inventory Management (Faculty of Business Administration, University of New Brunswick, NB Canada Fredericton), Date: Retrieved on Jun. 16, 2021, 83 Pages.

Janamanchi et al., Control Theory Concepts Applied to Retail Supply Chain: A System Dynamics Modeling Environment Study (Hindawi Publishing Corporation, Modelling and Simulation in Engineering, vol. 2013, Article ID 421350), Dated: 2013, 15 Pages.

Jenkens (Product Manager), Inventory Forecasting: Types, Best Practices, and Benefits, (Business Solutions Articles/Inventgory Management), Dated: Aug. 24, 2020, 22 Pages.

Pooja, Verma, 13 Essential Types of Supply Chain Management Tools for 2021 (https://www.selecthub.com), Dated: 2021, 25 Pages.

Nuridawati et al "Inventory Optimization Using Simulation Approach", Oct. 2018, Journal of Computing Research & Innovation (JCRINN) vol. 3, No. 2, pp. 38-47 (Year: 2018).

Ganesha et al (Integrated Inventory Management Control Framework), Apr. 2020, International Journal Management Technology and Social Sciences, pp. 147-157. (Year: 2020).

Inventory Management Tips for Online & Brick and Mortar Retailers, Dec. 2013, Warehouse & Inventory Management, p. 1 (Year : 2013).

* cited by examiner

METHODS AND SYSTEMS FOR INVENTORY PLANNING AND CONTROL

BACKGROUND

A supply chain network of an enterprise may be comprised of nodes, including distribution centers and stores. Units of an inventory item may initially flow from a distribution center to a store through an initial fulfillment process that is initiated by the store submitting a transfer order to the distribution center. As a number of units of the inventory item diminish and/or more units are desired at the store, subsequent units of the inventory item may be provided from the distribution center to the store through a replenishment process that is similarly initiated by the store submitting a transfer order to the distribution center.

The timing and logic involved in a replenishment process is complex. For example, a replenishment process may involve the flow of inventory item units from the distribution center to the store responsive to transfer orders, but may be based on, e.g., inventory levels, re-order points, stocking levels, picking and packing management, order lead times, and/or transit times, among other similar factors. Still further, in supply chain systems of significant size and complexity (e.g., often including hundreds or thousands of store locations, numerous distribution centers, and vendors) decisions regarding how best to allocate inventory across that supply chain are highly complex, due to the changing demand, inventory levels, etc. at each location. Accordingly, it can be difficult to visualize or model how a particular item or collection of items flows through a supply chain with an adequate level of detail to avoid significant real-world consequences such as out-of-stock events.

Accordingly, it is with respect to these and other general considerations that embodiments have been described.

SUMMARY

Some embodiments of the present disclosure relate generally to systems and methods for inventory planning and control. In some examples, the systems and methods generate a visualization tool user interface which displays a graphical view representing the inventory projections. In some of these examples, the graphical view is automatically updated based on received inputs adjusting a purchase order, selecting a node or a group of nodes, and/or selecting one or more vendors.

In one aspect, a method for visualizing an inventory management and control for a retail enterprise is disclosed. The method comprising receiving and aggregating inventory data from a plurality of nodes of the retail enterprise, scheduling a plurality of purchase orders for at least one item type based on the inventory data, generating inventory projections for the at least one item type based on the inventory data and the plurality of purchase orders, and rendering on a display, as part of a visualization tool user interface, a graphical view representing the inventory projections for the at least one item type. Wherein the graphical view automatically updates based on inputs received for adjusting at least one purchase order of the plurality of purchase orders and inputs received for selecting at least one node or at least one group of nodes from the plurality of nodes.

In another aspect, an inventory management and control system is disclosed. The inventory management and control system comprising at least one processor and at least one memory storage device. The memory storage device storing instructions which when executed by the at least one processor cause the inventory management and control system to receive and aggregate inventory data from a plurality of nodes of a retail enterprise, schedule a plurality of purchase orders for at least one item type based on the inventory data, generate inventory projections for the at least one item type based on the inventory data and the plurality of purchase orders; and render on a display, as part of a visualization tool user interface, a graphical view representing the inventory projections. Wherein the graphical view automatically updates based on inputs received to adjust at least one purchase order of the plurality of purchase orders and inputs received for to select at least one node or at least one group of nodes from the plurality of nodes.

Yet another aspect discloses one or more non-transitory computer-readable storage devices storing data instructions. The instructions, when executed by at least one processing device, cause the at least one processing device to receive and aggregate inventory data from a plurality of nodes of a retail enterprise, schedule a plurality of purchase orders for at least one item type based on the inventory data, generate inventory projections for the at least one item type based on the inventory data and the plurality of purchase orders, and render on a display, as part of a visualization tool user interface, a graphical view representing the inventory projections. Wherein the graphical view automatically updates based on inputs received to adjust at least one purchase order of the plurality of purchase orders and inputs received for to select at least one node or at least one group of nodes from the plurality of nodes.

Some embodiments of the present disclosure relate generally to systems and methods for inventory planning and control. In some examples, the systems and methods include receiving constraint definitions related to an inventory action (e.g., an inventory transfer or a purchase order) and automatically adjusting at least one inventory action based on an inventory issue caused by the inventory action.

One aspect is a method for inventory management and control, the method comprising receiving and aggregating inventory data from a plurality of nodes in a retail enterprise, receiving scheduled inventory actions and at least one constraint definition, detecting at least one inventory issue cause by the at least one constraint definition, and adjusting, automatically, at least one scheduled inventory action of the scheduled inventory actions based on the at least one inventory issue.

Another aspect is a system for inventory management and control, the system comprising, at least one processor, at least one memory storage device, the at least one memory storage device storing instructions which when executed by the at least one processor cause the system to receive and aggregate inventory data from a plurality of nodes in a retail enterprise, receive scheduled inventory actions and at least one constraint definition, detect at least one inventory issue cause by the at least one constraint definition, and adjust, automatically, at least one scheduled inventory action of the scheduled inventory actions based on the at least one inventory issue.

Yet another aspect is a user device, the user device comprising a display, at least one processor, and at least one memory storage device, the at least one memory storage device storing instructions which when executed by the at least one processor cause the user device to connect with an inventory management system, receive inventory data, scheduled inventory actions, and inputs selecting at least one constraint definition, send the at least one constraint definition to the inventory management system, and receive at least one updated scheduled inventory action, wherein the inventory management system automatically generated the at least one updated scheduled inventory action in response to detecting an inventory issue caused by the at least one constraint definition.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

FIG. 9A illustrates an example list view of a purchase plan able to be generated within a purchase plan application as described herein.

FIG. 9B illustrates an example list view of a purchase order plan able to be generated within the purchase plan application described herein.

FIG. 12 illustrates an example user interface for a purchase order summary.

DETAILED DESCRIPTION

Various embodiments will be described in detail with reference to the drawings. Reference to various embodiments does not limit the scope of the claims attached hereto. Additionally, any examples set forth in this specification are not intended to be limiting and merely set forth some of the many possible embodiments for the appended claims.

In general, the present disclosure is directed to methods and systems for inventory management. In some embodiments, a centralized service tracks and traces inventory. In some embodiments, a service is used for planning and using a purchase plan which allows a user to view forecasted purchases of items to achieve optimal inventory position.

Some embodiments of the present disclosure relate generally to systems and methods for inventory planning and control. In some examples, the systems and methods generate a visualization tool user interface which displays a graphical view representing the inventory projections. In some of these examples, the graphical view is automatically updated based on received inputs adjusting a purchase order, selecting a node or a group of nodes, and/or selecting one or more vendors.

Figure 1:
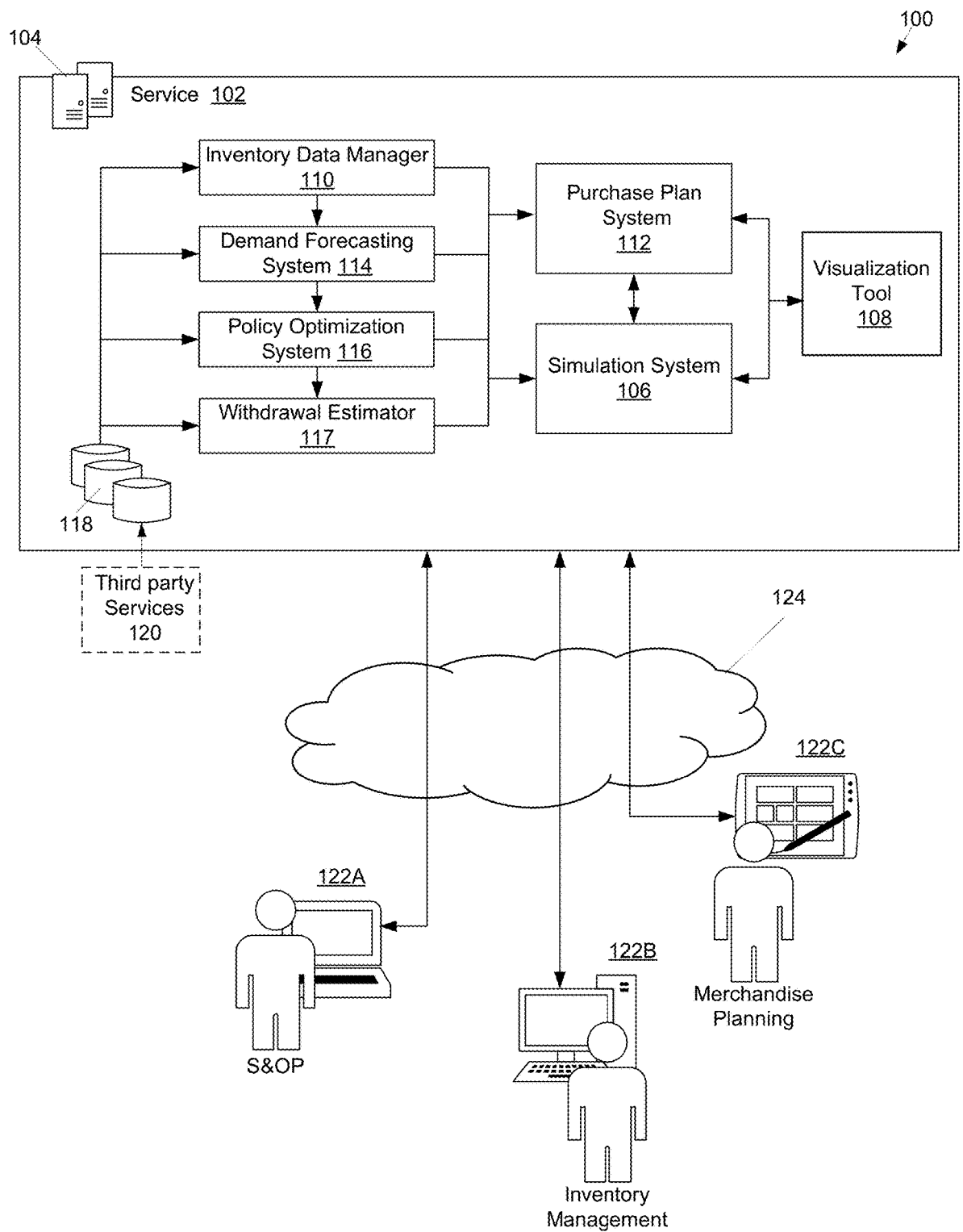
FIG. 1 illustrates an example network environment for a system for managing a supply chain.

FIG. 1 illustrates an example network environment for an inventory management system 100. The inventory management system 100 may be hosted by a service 102. In some examples, the service 102 also hosts a simulation system 106, a visualization tool 108, an inventory data manager 110, a purchase plan system 112, a demand forecasting system 114, a policy optimization system 116, and a withdrawal estimator 117. One or more servers or processors 104 may be operable to execute one or more components of the service 102, as part of the inventory management system 100 including the simulation system 106, the visualization tool 108, the inventory data manager 110, the purchase plan system 112, the demand forecasting system 114, the policy optimization system 116, and the withdrawal estimator 117. In other examples, one or more of the visualization tool 108, inventory data manager 110, purchase plan system 112, demand forecasting system 114, the policy optimization system 116, and the withdrawal estimator 117 are hosted externally by third party services 120.

In some examples, the service 102 may be associated with an enterprise, such as a retail enterprise that offers goods and/or services, also referred to herein as items, directly to consumers. In addition to online channels, the enterprise may have a plurality of physical stores through which items are sold. Additionally, the enterprise may have or be associated with one or more distribution centers that store the items until they are needed at one or more of the stores, or delivered directly to customers via online sales channels.

The distribution centers and stores may comprise nodes of a supply chain network for the enterprise.

In some embodiments, the inventory management system 100 allows a user to view a variety of aspects about the "first mile" (vendor to distribution center) or "middle mile" (distribution center to store) coordination. In some embodiments, the inventory management system 100 generates alerts when a supply chain problem is detected or projected. For example, specific alerts may be generated when the inventory management system 100 projects unfulfilled demand, detects item/location combinations with inadequate inventory, or detects item/location combinations which may result in out of stock or overstock conditions. In some embodiments, purchase order alerts may be displayed across a user interface. For example, a delay in scheduled receipt of a portion or all goods subject to the purchase order, a portion of the purchase order being withdrawn demand (e.g., inability of a supplier to provide requested goods). The effect of the event which caused the alert is applied across inventory movements within the supply chain.

In some embodiments, the inventory management system 100 allows users to view and modify inventory movements with a supply chain. A variety of transfers and moves can be facilitated using one of the various user interfaces (e.g., the example user interfaces illustrated in FIGS. 14-18). For example, node to node transfers may be initiated to transfer items between distribution centers, or among other nodes. In another example, a "removal" user interface presents item-based returns and allows management of removals and salvage operations occurring within a predetermined date range, for a particular reason or items, and at particular locations. A further example includes an order allocation user interface which allows a user to search for a particular allocation of an item across supply chain nodes (e.g., distribution centers, warehouses, port, transit, etc.). For example, the example user interfaces 1800 illustrated and described in reference to FIG. 18 and the example item chart 1900 illustrated and described in reference to FIG. 19. In some examples, specific departments or vendors may be searched, filtered, and displayed individually.

In some embodiments, the inventory management system 100 includes an inventory data manager 110. The inventory data manager 110 manages the inventory information for a supply chain of a retail enterprise. In some examples, the inventory information provides a snap shot of a state of inventory in the supply chain. In some embodiments, the inventory information is recorded internally by the service 102 and subsequently stored in the data stores 118. In alternative embodiments, the inventory information can be compiled with one or more separate internal services and/or a third party services. In some embodiments, the inventory data manager retrieves the inventory information from one or more of the data stores 118 to provide inputs to the purchase plan system 112, demand forecasting system 114, and/or simulation system 106. The inventory management system can further manage supply chain domain logic. Supply chain domain logic may include network inputs, product inputs, node inputs, arc inputs, and operation perturbations, among other example inputs.

The demand forecasting system 114 operates to predict the demand for items in the supply chain. In some embodiments, the demand forecasting system 114 receives supply chain information and supply chain domain logic from the inventory data manager 110 in addition to other data which may be used from the data stores 118. The received information is used to predict the demand for items. In some embodiments, the predicted demand is provided to the purchase plan system 112, the simulation system 106, and the policy optimization system 116.

The policy optimization system 116 generates one or more policies. The policies may be generated based on the current run-state of the supply chain and one or more business objectives set by the retail enterprise. A policy is a function that returns a decision, given the information about the system. The goal of the policy may be to optimize an objective over time. This optimization can further be based on the forecasted demand as determined by the demand forecasting system 114. In some embodiments, a snap shot of a current run-state of the supply chain is retrieved from one or more of the data stores 118 and/or the inventory data manager 110. In the example shown, the generated policies are provided to the purchase plan system 112, the simulation system 106, and the withdrawal estimator.

The withdrawal estimator 117 estimates inventory withdrawals from one or more warehouses and/or other supply chain nodes. In some embodiments, the estimated inventory withdrawal is based on one or more of the policies generated by the policy optimization system 116. The withdrawal estimator 117 further receives a snap shot of a current run-state of the supply chain from one or more of the data stores 118 and/or the inventory data manager 110. The estimated withdrawals are provided to the purchase plan system 112 and the simulation system 106.

In some embodiments, the inventory management system 100 includes a purchase plan system 112. The purchase plan system 112 allows a user to view forecasted purchases of items in order to view future inventory positions. In some examples, the purchase plan system 112 provides a coordinated user interface which displays both actual purchases and actual inventory alongside projected purchases to show an effect of inventory positioning within a retail enterprise (e.g., the user interfaces illustrated and described in reference to FIGS. 6A-8). In some embodiments, the coordinated user interface shows actual orders, projected orders, and both fulfilled and unfulfilled demand alongside selectable items, locations, and vendors. In some examples, the purchase plan system 112 receives projected orders and receipts from a plurality of systems and consolidates those projections within a single application. In some of these examples, the application schedules automated process steps, such as purchases of particular inventory, as simulated inventory within the retail supply chain. Users may view projected purchases and may override those projected purchases based on a variety of factors using one of the devices 122A, 122B, and 122C. If changes are made to projected orders, the impact of the change in terms of output can be simulated, using the simulation system 106, and projected within the purchase plan system 112. In some examples the purchase plan runs at an item level or a day level at a particular distribution center. Similarly, a user interface may be configured to display a particular department, class, subclass, style of goods, and across any collection of items and locations, or for particular vendors.

In one example, users of the purchase plan system 112 view projected automated orders, and can change an underlying feature (e.g., by changing timing or quantity of an order or an underlying assumption or constraint that may trigger an automatic order) to adjust the timing or level of order that is made. The automatic projecting is captured daily to enable users to determine a root cause of why particular issues may arise. In particular, inventory levels, fulfilled demand (based on a demand forecast) and unfulfilled demand can each be viewed on a daily level.

The purchase plan system 112 further provides simulation capabilities (in some embodiments, in coordination with the simulation system 106) usable to generate various metrics illustrating the effectiveness of particular purchase plans. For example, an average number of out of stocks, an average number of visual out of stocks, average weekly receipts, total receipts, and initial orders may all be viewed on a quarterly basis to assess overall effectiveness of a particular purchase plan for a class of items. In some examples, users utilize the user interface to compare trade-offs of spending (e.g., in the context of initial orders) versus guest experience (e.g., in the context of out of stocks or visual out of stocks).

The inventory management system 100 includes a simulation system 106. The simulation system 106 may perform the simulation on a per-item, per-node, and per-epoch basis. As per-epoch input, the simulation system 106 may receive supply chain information from the inventory data manager 110 including supply chain domain logic and a snap shot of a current run state of the supply chain, a demand for an item at a node predicted by the demand forecasting system 114, one or more policies generated by the policy optimization system 116, and other inventory management information and commands as part of the inventory management system 100, a purchase plan information or commands from the purchase plan system 112, and estimated withdrawals from the withdrawal estimator 117, etc. As described in more detail with reference to FIG. 3, the simulation system 106 may process the domain logic, the demand, the policies, the inventory management information and commands, and the purchase plan to generate a stream of action events. A stream of corresponding observed events may be generated from the stream of action events. The stream of observed events, optionally in combination with the action events and inputs, may then be transformed into metrics, and values thereof are provided as output of the simulation system 106.

In some examples, one or more of the inputs received by the simulation system 106 may be generated internally by the service 102 and subsequently stored in the data stores 118. In other examples, one or more of the inputs may be generated externally by the third party services 120 and provided to the service 102 for storage in the data stores 118. In some embodiments, at least some of the supply chain domain logic received as input may include network inputs, product inputs, node inputs, arc inputs, and operation perturbations, among other example inputs. As described above, some portions of the supply chain domain logic in addition to other data may be used by the demand forecasting system 114 to predict the demand for the item and the policy optimization system 116 to generate one or more policies. In some examples, each type of data may be stored in separate data stores 118. In other examples, the various types of data may be combined in one or more of the data stores 118.

In some examples, the simulation system 106 operates with the purchase plan system 112 for receiving constraints definitions and subsequently modifying automated purchasing decisions to adjust timing and levels of automated orders to account for vendor constraints (e.g., holidays) or supply chain constraints (e.g., inbound capacity), with related simulating and end-effect analysis. The constraint definitions may be used proactively to generate purchase orders automatically in advance to ensure adequate supply is obtained prior to unavailability.

In one embodiment, the service 102 may interoperate with various applications to enable users affiliated with the enterprise to submit requested metrics to and subsequently receive corresponding values for the metrics (e.g., the output from the simulation system 106) over a network 124. For example, the users may execute a thin version of an application (e.g., a web browser) or a thick version of the application (e.g., a locally installed application) through devices 122A, 122B, and 122C, collectively devices 122. The devices 122 may include a desktop computer (e.g., device 122B), a laptop computer (e.g., device 122A), a tablet computer (e.g., 122C), a smart phone, or wearable computing device, among other similar devices. An application programming interface (API) may facilitate communication between the service 102 and the devices 122 and/or the simulation system 106 and the devices 122 over one or more networks, such as the network 124. In other examples, the application can be hosted by a third party service, such as one of the third party services 120, where the third party service serves as a communication intermediary between the service 102 or simulation system 106 and devices 122.

In some examples, the users may be affiliated with different aspects of the enterprise supply chain management, such as sales and operations planning (S&OP), inventory management, and merchandise planning. One or more of S&OP, inventory management, and merchandise planning, may utilize certain types of the output (e.g., values for certain metrics) as input for subsequent processes. Therefore, the types of metrics requested may be based on which aspect of the enterprise supply chain management the user is affiliated with. The types of metrics requested may be additionally or alternatively based on a type of simulation being performed.

In additional examples, the output of the simulation system 106 (e.g., values for the metrics requested) and/or the purchase plan system 112 (e.g., modifications to the purchase plan) may be provided to the visualization tool 108. The visualization tool 108 may generate an interactive user interface (e.g., a visualization tool user interface) that is rendered on a display of one or more of the user's devices 122. The user interface may display projected inventory positions of items across the nodes of the supply chain based on a level of granularity selected by the user to view metrics associated with the output. Additionally, user inputs received from one of the devices 122 are provided to the inventory management system 100. These inputs can include inputs and adjustments to the purchase plan system 112 and the simulation system 106.

Figure 2:
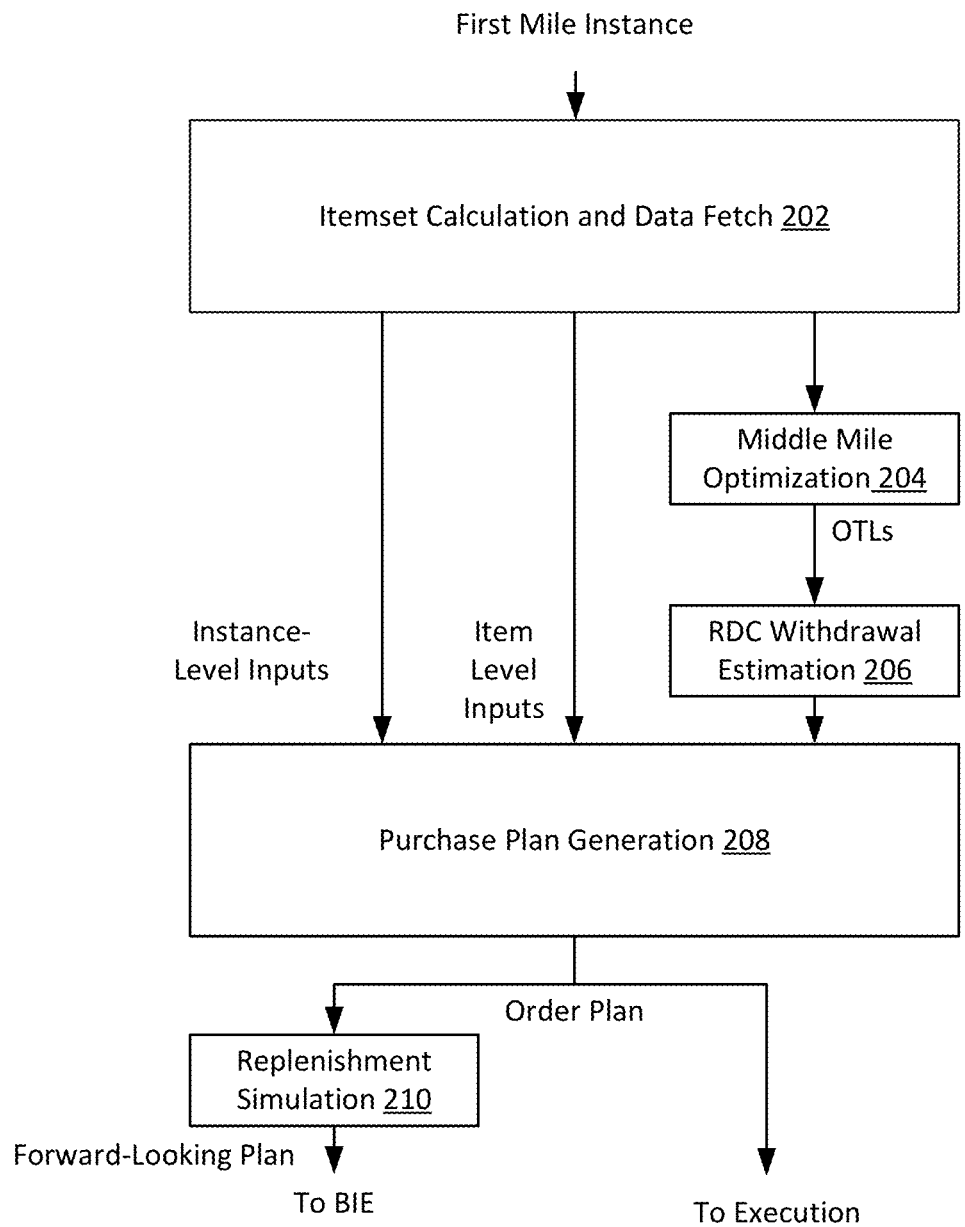
FIG. 2 is a block diagram of an example supply chain optimization and visualization architecture useable in the system of FIG. 1.

FIG. 2 is a block diagram of an example supply chain optimization and visualization architecture 200 useable in the system of FIG. 1. In the example shown, the architecture includes a multi-stage arrangement performing first-mile and middle-mile optimization processes in a manner integrated with supply chain simulation systems to allow simulated future inventory positions to inform purchase order generation and inventory positioning decisions within an enterprise supply chain having a multi-level node arrangement.

In the example shown, the architecture 200 includes an itemset calculation and data fetch stage 202 that receives, from a first mile instance, inventory item data and item arrival data associated with actual purchase orders currently pending, as well as other current enterprise supply chain status information. The itemset calculation and data fetch stage 202 determines inventory positions for items/classes at each node.

A middle mile optimization stage 204 performs a middle mile optimization process to ensure proper positioning of items among nodes in the enterprise supply chain, and provides to a warehouse withdrawal estimation stage 206 various middle mile (between warehouse and retail store) movements as needed to match anticipated demand at each node.

A purchase plan generation stage 208 generally receives instance-level inputs and item-level inputs from the itemset calculation and data fetch stage 202, as well as information about middle mile moves from the middle mile optimization stage 204 and warehouse withdrawal estimation stage 206, and generates a purchase plan for use by the enterprise. The purchase plan is provided as an order plan which is in turn delivered for execution, and also provided to a replenishment simulation system 210. The replenishment simulation system 210 uses the current order plan in association with anticipated demand for each item at each node to determine future inventory effects. As discussed herein, one or more visualizations may be generated that display the purchase plan and inventory effects, thereby allowing users to modify the order plan to accommodate potential supply chain issues that may arise in the future (e.g., unfulfilled demand due to stockouts, inventory imbalance, mistimed purchase order generation, etc.). From this information, additional downstream analyses may also be generated to allow various end users to view the purchase plan from different perspectives and levels of granularity, including a roll-up of individual supply chain issues into an end-effect analysis on overall supply chain performance (and therefore enterprise revenue).

Figure 3:
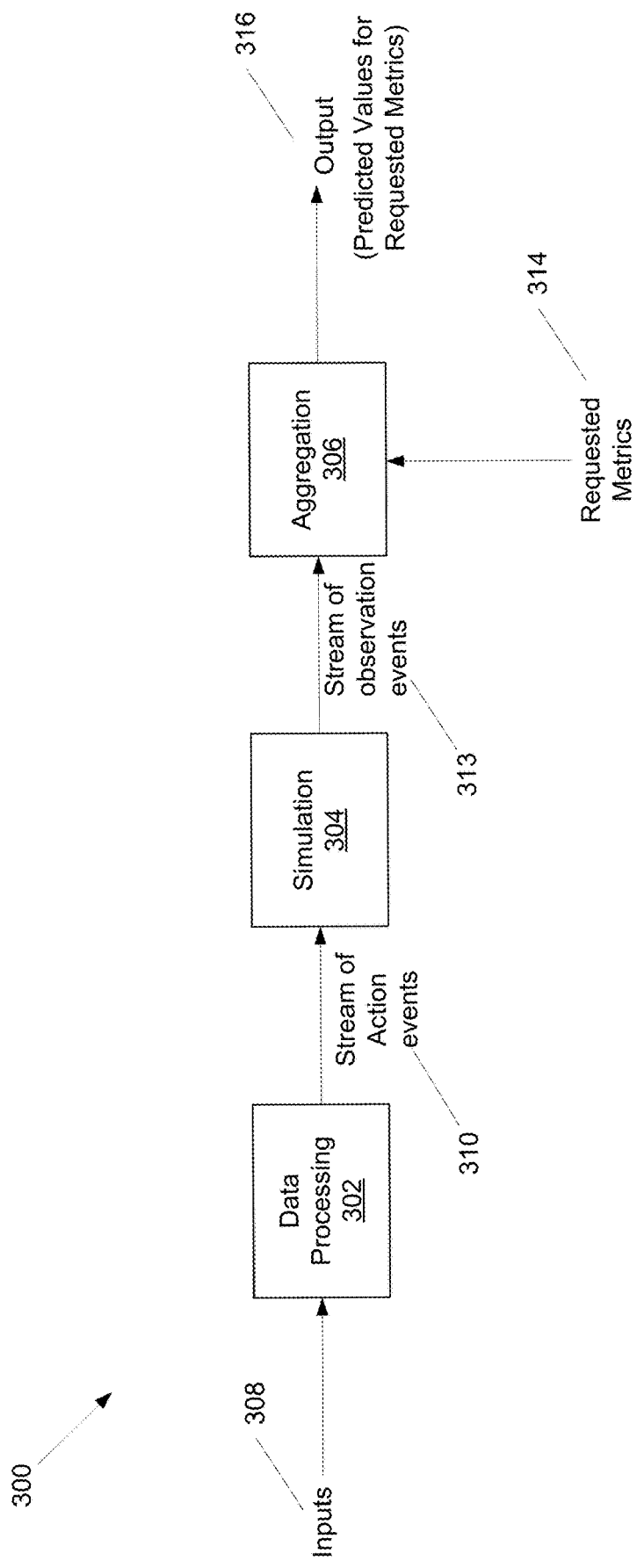
FIG. 3 is a conceptual diagram illustrating example processes of the simulation system of FIGS. 1-2.

FIG. 3 is a conceptual diagram illustrating example processes 300 of the simulation system 106. Example processes performed by the simulation system 106 may include at least data processing 302, simulation 304, and aggregation 306. The simulation system 106 may perform these processes on a per-item, per-node, and per-epoch basis for an enterprise supply chain network.

In some examples, the node may be a store (e.g., a child node) that receives and sells items. In other examples, the node may be a distribution center (e.g., a parent node) that receives and processes items to send to one or more stores or other distribution centers. For the simulation system 106, the node defines at least an initial state of inventory, including whether the item is in a backroom or on a shelf, and business parameters, including shelf capacity and package count, for the node. If the node is a distribution center, the node further defines the child nodes it replenishes and a lead time to reach each of the child nodes, incoming vendor purchase plans, and truck mechanics (e.g., truck schedules).

An epoch may be a predefined interval of time. One example epoch may be a day defined by a node's hours (e.g., from opening until closing). More specifically, the epoch may be a day that has not yet occurred, and thus the epoch may be a future epoch. A number of epochs to be run by the simulation system 106 may be defined. As one example, a plurality of epochs up to hundreds of days into the future may be defined.

Additionally, because the simulation system 106 utilizes input data associated with random processes, such as demand or even scheduled transfers, predicted values for requested metrics output by the simulation system 106 may have lesser certainty. Therefore, to increase certainty, the simulation system 106 may repetitively perform these processes for a same item at a same node per epoch to build statistics for the underlying probability distribution. For example, execution of the data processing 302, simulation 304, and aggregation 306 processes for an item at a node for a given epoch may constitute a single trace. These processes may be repeated to generate a plurality of traces for the item at the node for the given epoch. Predicted values for the metrics may be aggregated over the plurality of traces to generate statistics, such as mean, standard deviation, or specific quantiles, for provision as output of the simulation system 106.

During the data processing 302, inputs 308 may be received and processed to generate a plurality of action events. The inputs 308 may include inventory management information or commands provided by the inventory management system 100, purchase plan modifications provided by the purchase plan system 112, domain logic associated with the supply chain, demand predicted for the item at the node provided by the demand forecasting system 114, and one or more policies generated by policy optimization system 116. In some examples, the generated action events may then be merged to form a stream of action events 310.

Additionally, during the data processing 302, options for defining the simulation process may be selected. For example, a number of traces to be performed may be selected. Also, which statistics are to be computed over the traces may be selected. Further, a time span for the simulation (e.g., the number of epochs to be run) may be selected.

The stream of action events 310 formed from the data processing 302 may be applied to a current run-state of the supply chain during the simulation 304 to yield a stream of observation events 312. The current run-state of supply chain may represent inventory for the item across nodes and on-order transfers. In some examples, the stream of observation events 312 may correspond one to one with the stream of action events 310. For example, every action event within the stream of action events 310 may yield a corresponding observation event within the stream of observation events 312. In other examples, one or more of the action events within the stream of action events 310 may not be observable (e.g., may not have a corresponding observation event). If an action event is not observable, the action event may be performed on the run-state of the supply chain, however a decision may be made that no observation event is to be output as part of the stream of observation events 312. In further examples, the simulation 304 may yield an observation event corresponding to an outside cadence rather than an action event that is included in the stream of observation events 312.

The stream of observation events 312 yielded from the simulation 304 may be transformed to generate one or more metrics during the aggregation 306. The transformation performed during the aggregation 306 may be based on requested metrics 314 received as input from a user. Often, the requested metrics 314 are related to inventory and changes thereto over the epoch. Predicted values for the requested metrics 314 may be provided as output 316 of the simulation system 106. The output 316 may be provided periodically (e.g., provided per epoch) or upon demand. In some examples, additional reporting or post-processing logic may be applied to the metrics. Additionally or alternatively, the stream of observation events 312 (e.g., pre-transformation raw data) may be used as inputs in another process or simulation.

Additional details and examples of processes for the simulation system 106 including the data processing 302, simulation 304, and aggregation 306, as well as the demand forecasting system 114, policy optimization system 116, and visualization tool 108 are illustrated and described in U.S. application Ser. No. 16/890,821 filed on Jun. 2, 2021 for an "USER INTERFACE FOR VISUALIZING OUTPUT FROM SUPPLY CHAIN REPLENISHMENT SIMULATION", the disclosure of which is hereby incorporated by reference in its entirety.

Figure 4:
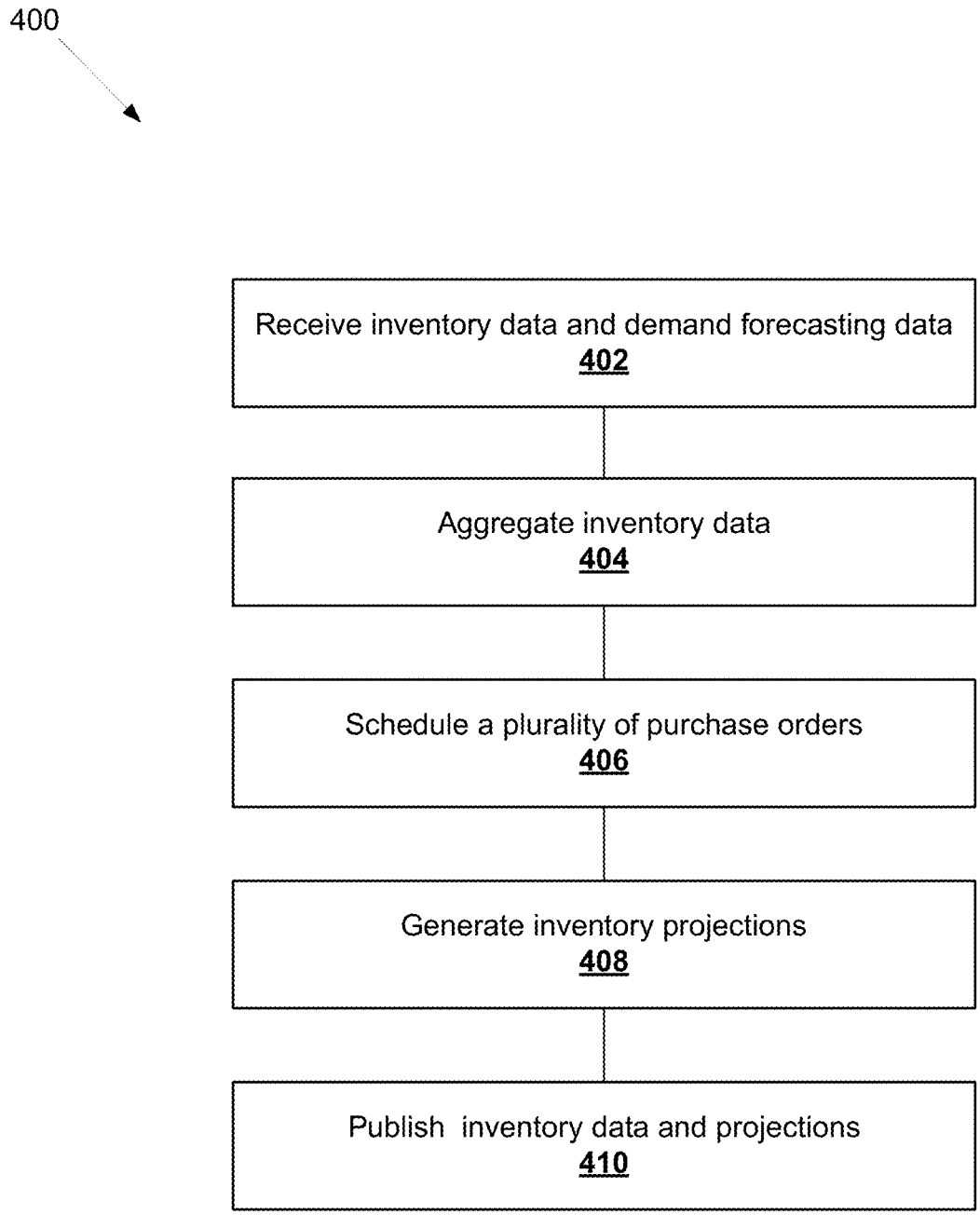
FIG. 4 illustrates an example method for generating a purchase plan.

FIG. 4 illustrates an example method 400 for generating a purchase plan. In some embodiments, the example method 400 is performed as a set of instructions executed on at least one processing device of the purchase plan system 112 illustrated in FIG. 1. The method 400 includes the operations 402, 404, 406, 408, and 410.

In example embodiments, operation 402 receives inventory data and demand forecasting data. In some examples the inventory data includes projected orders and receipts for a plurality of nodes. In these embodiments, the purchase plan receives the inventory data from computing systems associated with each of the plurality of nodes. In some examples, the inventory data includes demand for an items at a plurality of nodes predicted by the demand forecasting system 114 and one or more policies generated by the policy optimization system 116. Additionally, inventory data can be received from one or more vendors.

In example embodiments, operation 404 aggregates the inventory data. The operation 404 consolidates the inventory data to be used by the purchase plan system. In some embodiments, the aggregated data is stored in the data stores 118. In some examples, the inventory data is placed in logical groups. For example, based on inventory position, withdrawal, projected orders, etc.

Existing solutions use disparate data sources. By way of contrast, the operation 402 and 404 receives and aggregates all types of orders and projections at the same place. Because data is all pulled into the same tool, conclusions such as "unfulfilled demand" or "predicted unfulfilled demand" are able to be arrived at, where that would not previously be possible. This is because, while in the current system, actual orders and demand forecasts may be correlated to determine ability to fulfill demand during a future epoch based on current conditions or assumptions. Order levels can be on a daily, weekly, monthly, quarterly, annually, etc. basis for various items and locations, calculated in real time, with searches available on a by-vendor and/or by-location basis. Additionally, the aggregated inventory data ensures that analysts and planners do not review different datasets that are refreshed at different times. Additionally, analysts and planners no longer need to access multiple different datasets entirely. The use of a unified data set and set of visualizations allows for coordination among stakeholders.

In example embodiments, operation 406 schedules a plurality of purchase orders. The operation 406 schedules purchases of inventory based on the aggregated inventory data. In some embodiments, the operation 406 schedules purchases of items automatically. In some examples, the purchase order is scheduled using the simulation system 106 to simulate various options and select an optimal result. In some embodiments, the operation 406 schedules automated process steps, such as purchases of particular inventory, as simulated inventory within the retail supply chain changes. For example, process steps may be added, removed, or modified in real time as the user makes changes manually to current or future operations (e.g., by adjusting a time or quantity of an item order, canceling or modifying an anticipated automated item order, rebalancing stock, or other analogous operations).

In example embodiments, operation 408 generates inventory projections. The inventory projections are generated based on the aggregated inventory data. In some embodiments, the inventory projections are based on a the current snap shot of inventory, forecasted demand, and scheduled purchase orders. Other data is also used, for example replenishment time. In some embodiments, the aggregated inventory data is provided to the simulation system 106 which makes the inventory projections. In some embodiments, a user can configure the projections to be on a per node basis, a group of nodes basis (e.g., nodes within a set region), on an item basis, or on a period of time basis. In some embodiments, the purchase plan is run on the item level and day level.

In some examples, the operations 406 and 408 operate together to schedule purchases based on inventory projections. For example, if unfilled demand is predicted and detected in the inventory projections the operation 406 may adjust a scheduled purchase order to meet the unfilled demand. In other examples, the operation 406 may adjust the date of the future purchase so the order is received when it is needed.

In example embodiments, operation 410 publishes inventory data and inventory projections. In some embodiments, the operation 410 publishes and makes it available the inventory data and inventory projections via an application programming interface (API). In alternative embodiments, the information is stored in a data store which is made available to devices with authenticated accounts.

Figure 5:
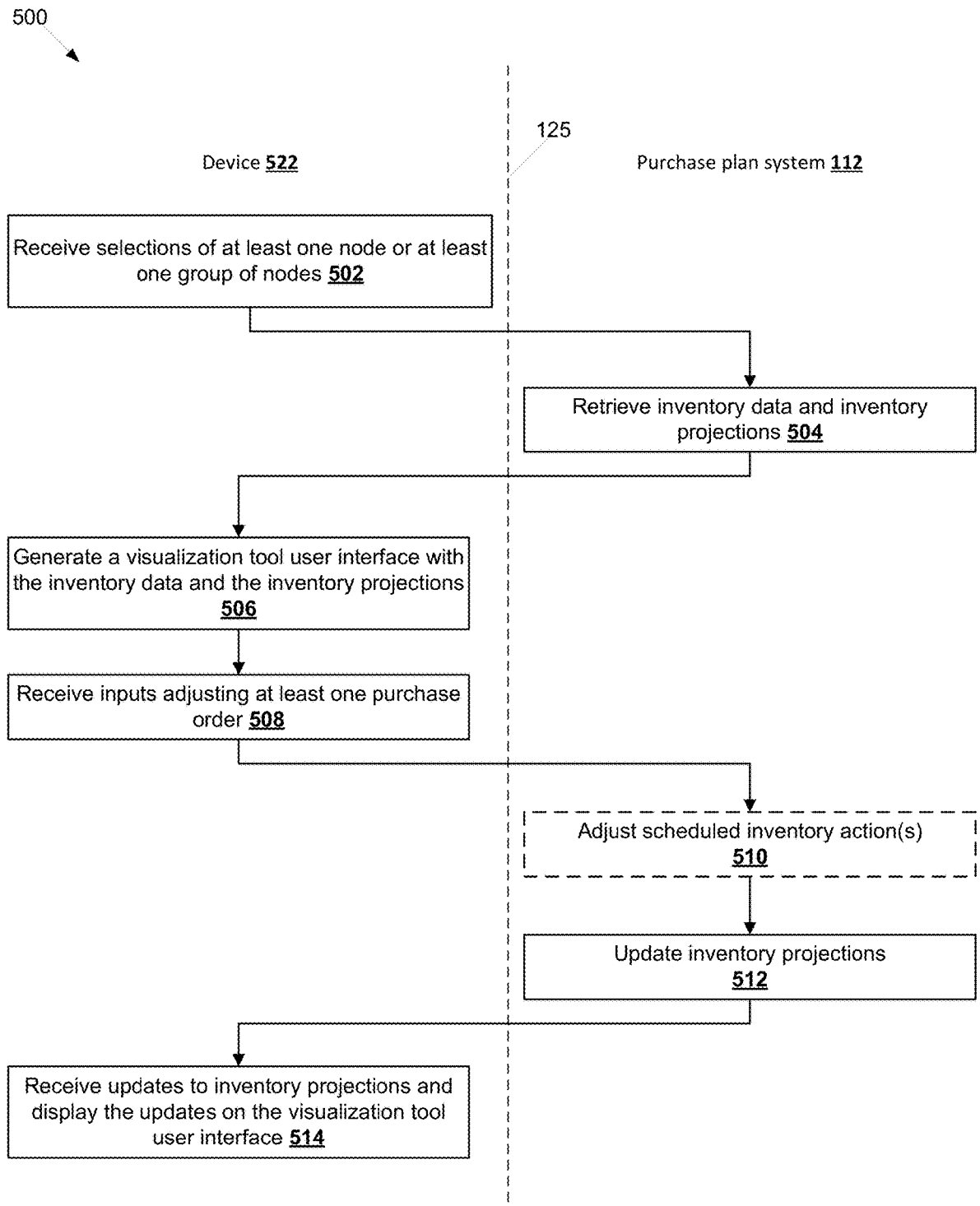
FIG. 5 illustrates a system flow diagram of an example method for modifying a purchase plan.

FIG. 5 illustrates a system flow diagram of an example method 500 for modifying a purchase plan. In some embodiments, the method 500 is executed on a device 522 (e.g., one of the devices 122) in communication with the purchase plan system 112 via the network 124. For example, using the inventory management system 100 illustrated in FIG. 1. The method 500 includes the operations 502, 504, 506, 508, 510, 512, and 514.

The operation 502 receives inputs selecting at least one node or at least one group of nodes. A node may correspond to a single store or warehouse, as noted above. A group of nodes may correspond to a set of similarly-situated nodes (e.g., a set of warehouses, a set of similar-format stores, or the like) or a regional group of stores/warehouses. In some embodiments, a user selects a node or group of nodes for applying an adjustment to a purchase order. For example, a user can select one or more specific retail locations or distribution centers (node) or a region of retail locations (group of nodes). In alternative embodiments, instead of selecting a node a user may select at least one item and/or a user selects one or more vendors.

In some examples the selection of the at least one node or the at least one group of nodes are provided to the purchase plan system 112, for the operation 504. In other embodiments the device 522 includes the inventory data and projections locally and the operation 504 is performed on the device 522.

At the operation 504 the purchase plan system retrieves inventory data and inventory projections for the selected node(s). In some embodiments, the operation 504 includes the method 500 illustrated and described in reference to FIG. 5. In some embodiments, the inventory data and inventory projections for the nodes or group of nodes is retrieved from a data store. The purchase plan system 112 provides the inventory data and the inventory projections to the device 122. For example, by publishing the data and making it accessible via an API or by sending a message to the device 122.

In example embodiments, operation 506 generates a visualization tool user interface displaying the inventory data and/or the inventory projections. In some embodiments, the visualization tool user interface includes a graphical view of the inventory projections. The visualization tool user interface can also (or alternatively) display various metrics such as average cost, average retail price, average lead time, etc.

In some embodiments, different versions of the inventory data and projections can be visualized. For example, a first version may run daily, and a longer version may run weekly, etc. In some embodiments, inventory levels, fulfilled demand (based on a demand forecast) and unfulfilled demand can each be viewed on a daily level. In some embodiments, the display can be reconfigured for a particular department, class, subclass, style of goods, and across any collection of items and locations, or for particular vendors.

In example embodiments, operation 508 receives inputs adjusting at least one purchase order. In some examples adjusting at least one purchase order includes adding a purchase order for one or more items, removing a purchase order, adjusting the timing of a purchase order, adjusting a quantity for a purchase order, adjusting a source or destination node for the purchase order, etc. The adjustments (received as inputs at a user device) are provided to the purchase plan system. In many embodiments, the visualization tool user interface allows a user to interact with interface and make forward adjustments to at least one purchase order. In some embodiments, one or more users may view projected purchases and may override the projected purchases based on experience. In some examples, when the user makes an adjustment to the purchase plan the timing or level of other orders are also adjusted.

In some embodiments, the adjustments are sent to the purchase plan system 112, for the operations 510 and 512. In alternative embodiments, the operations 510 and 512 are performed on the device 522.

In example embodiments, operation 510 adjusts scheduled inventory actions. In some examples, only the received adjustments are made. In some embodiments, other inventory actions are automatically adjusted based on the received adjustments. For example, if one order is rescheduled then the future orders are similarly rescheduled. In some examples, the simulation system 106 is used to simulate various changes and determine an optimal set of adjustments to make in addition to the received adjustments.

In example embodiments, operation 512 updates the inventory projections. The purchase plan is updated based on the adjustments. For example, if the purchase plan is adjusted to increase the quantity of an item, the inventory projections are adjusted based on the increase. In some embodiments, the adjustments are simulated (e.g., using the simulation system 106) to determine the impact of the changes.

In example embodiments, operation 514 receives updates to the inventory projections and display the updates on the visualization tool user interface. The operation 510 updates the visualization tool user interface generated at the operation 506. For example, by updating the graphical view based on the adjustments to the purchase plan. Other metrics can also be updated and display. For example, an average number of out of stocks, an average number of visual out of stocks, average weekly receipts, total receipts, and initial orders may all be viewed.

In typical embodiments, the operations 508, 510, 512, and 514 occur in real time as a user interacts with the visualization tool user interface. This allows a user to make adjustments and see the impact of each adjustment in real time. In some embodiments, the user provides experience and expertise to make adjustments and can use the graphical user interface to detect possible issues which may arise with each purchase plan.

Changes in low-level adjustments regarding timing of purchase orders or receipt of goods at a distribution center may be reflected in met or unfulfilled demand, which are then aggregated into simulated overall revenue or profitability. The purchase plan system can make changes to a purchasing plan without needing to wait for execution of the plan to determine outcomes. In some embodiments, the purchase plan system 112 automatically regenerates simulated results of the plan to allow users to see end effects of changes in a plan.

Figure 6A:
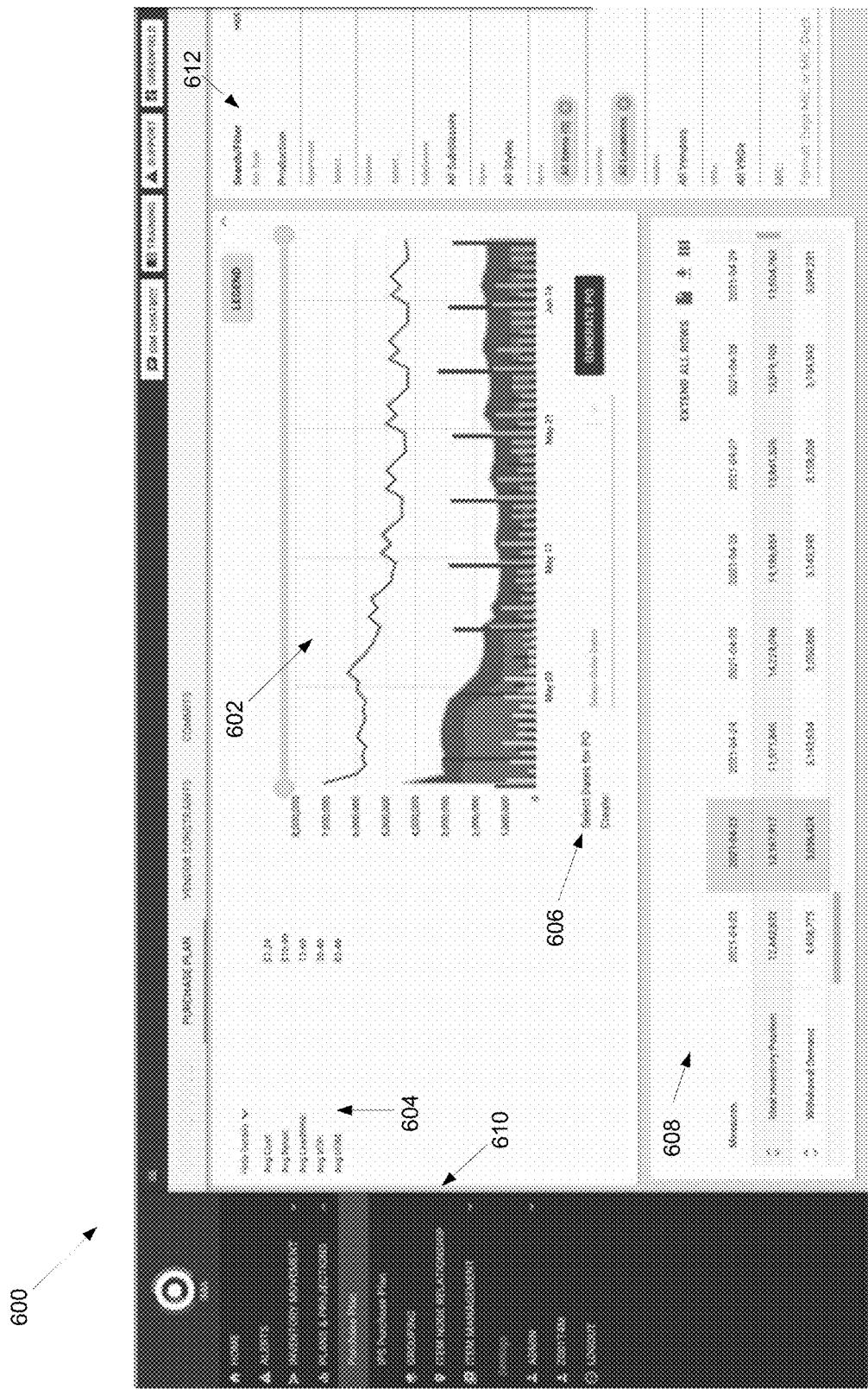
FIGS. 6A-6B illustrate an example user interface for a purchase plan application.
Figure 6B:
Figure 7:
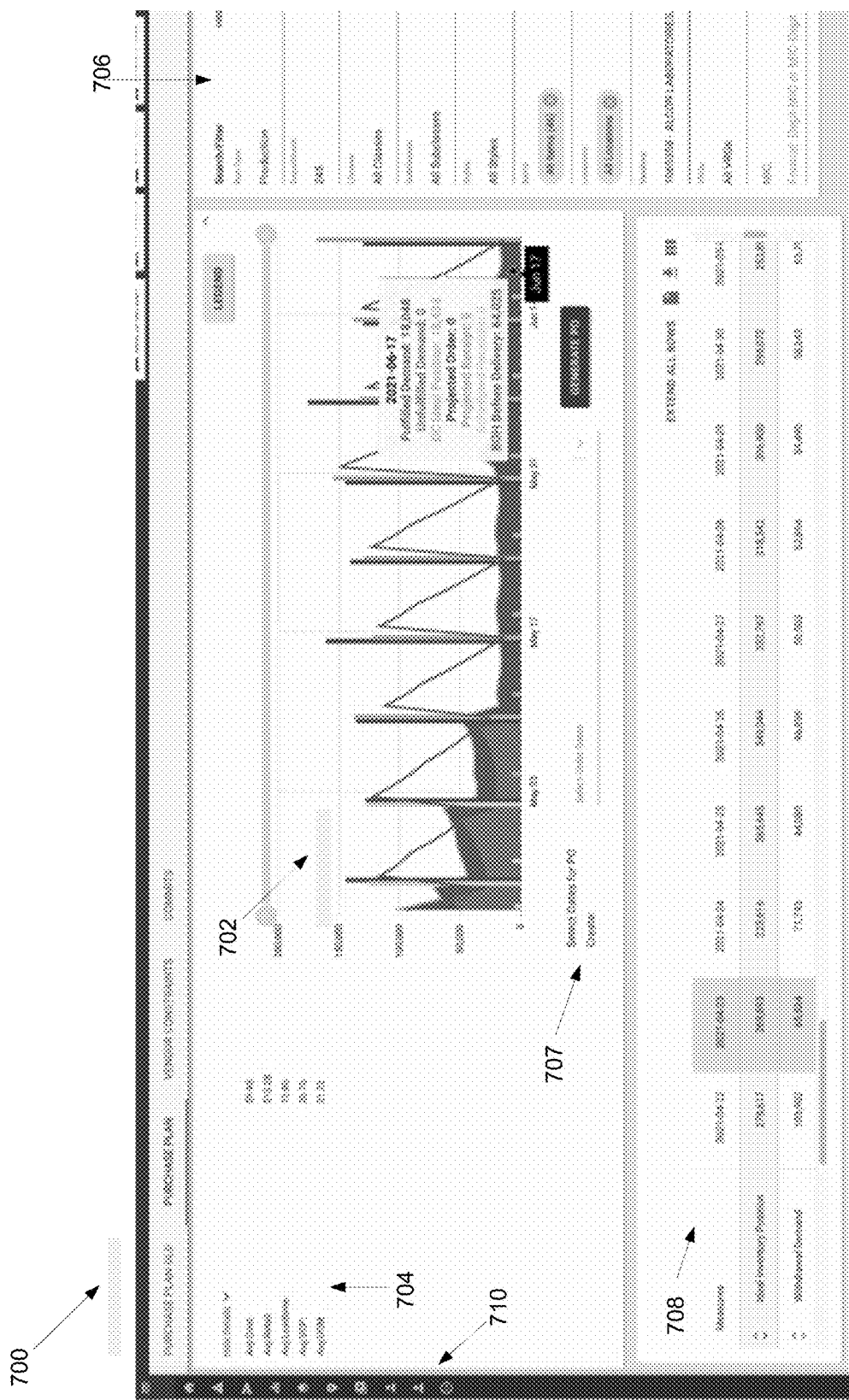
FIG. 7 illustrates a further example user interface for the purchase plan application.

FIGS. 6A-7 illustrate various example user interfaces for a device interacting with the purchase plan application.

FIGS. 6A-6B illustrate an example user interface 600 for a purchase plan application. In some embodiments, the user interface 600 shows actual orders, projected orders, and both fulfilled and unfulfilled demand alongside selectable items, locations, and vendors. In some embodiments, as a user makes adjustments to the purchase plan (e.g., the method 500 illustrated and described in FIG. 5) the purchase plan simulates and determine end-effects to such user adjustments. The user interface 600 updates and present these effects to one or more users.

The user interface 600 includes a graphical view 602 representing the inventory projections, inventory metrics 604, create purchase order interface 606, chart view 608 representing the inventory projections (illustrated in greater detail in FIG. 6B), navigation interface 610, and search/filter interface 612. The user interface 600 provides a single source to view the inventory for a supply chain. In some examples, the user interface 600 is accessible by different users including third party vendors. In some examples, the vendors display will automatically populate with one or more nodes associated specifically with the vendor.

The graphical view 602 presents a graphical representation of the inventory projections. The graphical view 602 can assist a user visualize the impact of the purchase plan for selected items in selected locations. In some embodiments, the user makes updates to the purchase plan and the changes are reflected in real time on the graphical view. The graphical view shows actual purchase orders, order date, projected date of receipt, projected receipt, projected orders, fulfilled demand, unfulfilled demand, ideal position, etc. In some examples, fulfilled demand and unfulfilled demand are stacked on the chart. In some examples, fulfilled demand is a neutral color (e.g., gray) and the unfulfilled demand is a bright color which catches a user's eye (e.g., red).

The inventory metrics 604 displays various inventory metrics. In the example user interface shown, the metrics show include metrics for items at a particular node. For example, average cost, average retail cost, average lead time, etc.

The create purchase order interface 606 is an example user interface for adjusting the purchase plan by creating a new purchase order. In some examples, adjustments to the purchase plan are made using the user interface 1700 illustrated in FIG. 17, and projected effects of such purchase plans may be presented within the graphical view 602.

The chart view 608, shown in greater detail in FIG. 6B, display the inventory data and inventory in logical groups. The data in the chart view includes inventory data for an item at various dates. In some examples, the data include exact numbers for past dates and forecasted numbers for future dates. In some examples, the dates and associated inventory data can be retrieved/generated and displayed on a daily, weekly, or monthly basis. In some examples, the filter fields will only appear if there is underlying data present.

The navigation interface 610 includes various tabs to navigate between different views with different features. The search/filter interface 612 includes various fields for entering one or more filters. In some embodiments, the graphical view 602 and the chart view 608 are automatically updated in real time as a user enters filters. Filters may include, for example, specific departments or classes/subclasses of items, item styles, specific items, locations, vendors, vendor groups, and the like.

FIG. 7 illustrates an example user interface 700 for a purchase plan application. The user interface 700 is another example of the user interface 600 illustrated in FIGS. 6A-6B. The user interface 700 includes a graphical view 702 representing the inventory projections, inventory metrics 704, create purchase order interface 706, chart view 708 representing the inventory projections, navigation interface 710, and search/filter interface 712.

The graphical view 702 is another example, of the graphical view 702 illustrated in FIG. 7A. The illustrated in the graphical view shows the quantity of available items at the node, both in the past and as expected to occur in the future. This allows a user to determine the required lead time for the items. The bars represent when orders are projected to be ordered and received. In some examples, one bar shows the automatic purchase order and another color bar shows the manual purchase orders. When the date of the purchase order arrives (the date with the bar), the orders is automatically placed with an appropriate vendor.

In the example shown, the graphical view 702 includes a stacked area chart showing fulfilled demand and unfulfilled demand. The unfulfilled demand can represent, in some cases, actual unfulfilled demand occurring in the past based on a demand expectation and actual inventory levels. In other instances, unfulfilled demand pay be displayed as a comparison between demand and expected on-hand inventory in the future. In some examples, a vendor can adjust the lead times and reorder points or volumes to increase or decrease volume on hand in the future (e.g., as adjusted automatically in accordance with order lead times or shipping lead times for items to arrive at the selected location within a supply chain).

The inventory metrics 704, create purchase order interface 706, chart view 708 representing the inventory projections, navigation interface 710, and search/filter interface 712 are analogous to those illustrated and described in reference to FIGS. 6A-6B.

FIGS. 8-11 describe further graphical views that may be presented within a user interface, such as the user interfaces of FIGS. 6A-6B and FIG. 7, and represent various views presentable to different stakeholders within an enterprise, showing end effects of a current purchase plan.

Figure 8:
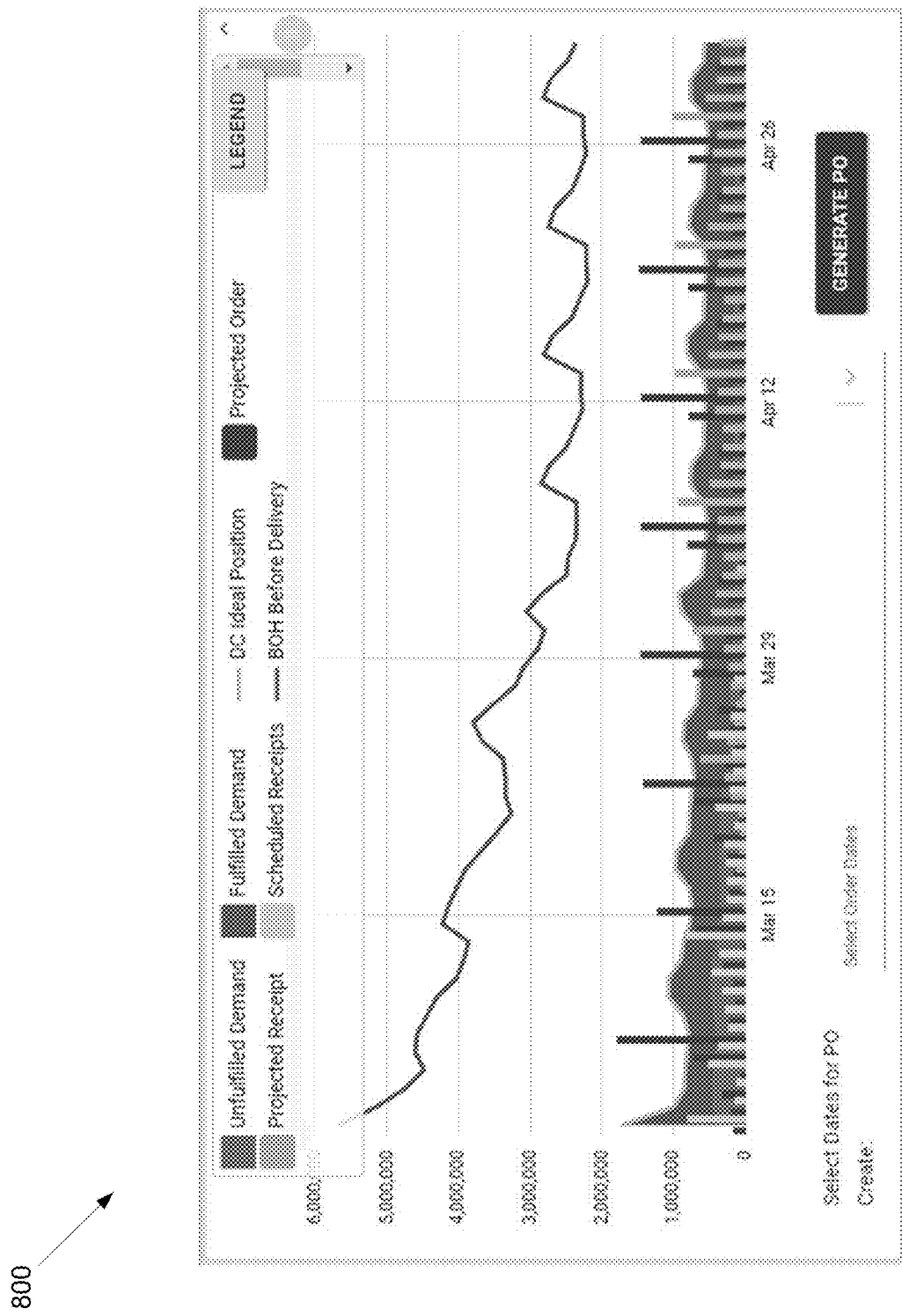
FIG. 8 illustrates an example graphical view presentable within a purchase plan application as described above in conjunction with FIGS. 6A-6B and FIG. 7.
Figure 17:
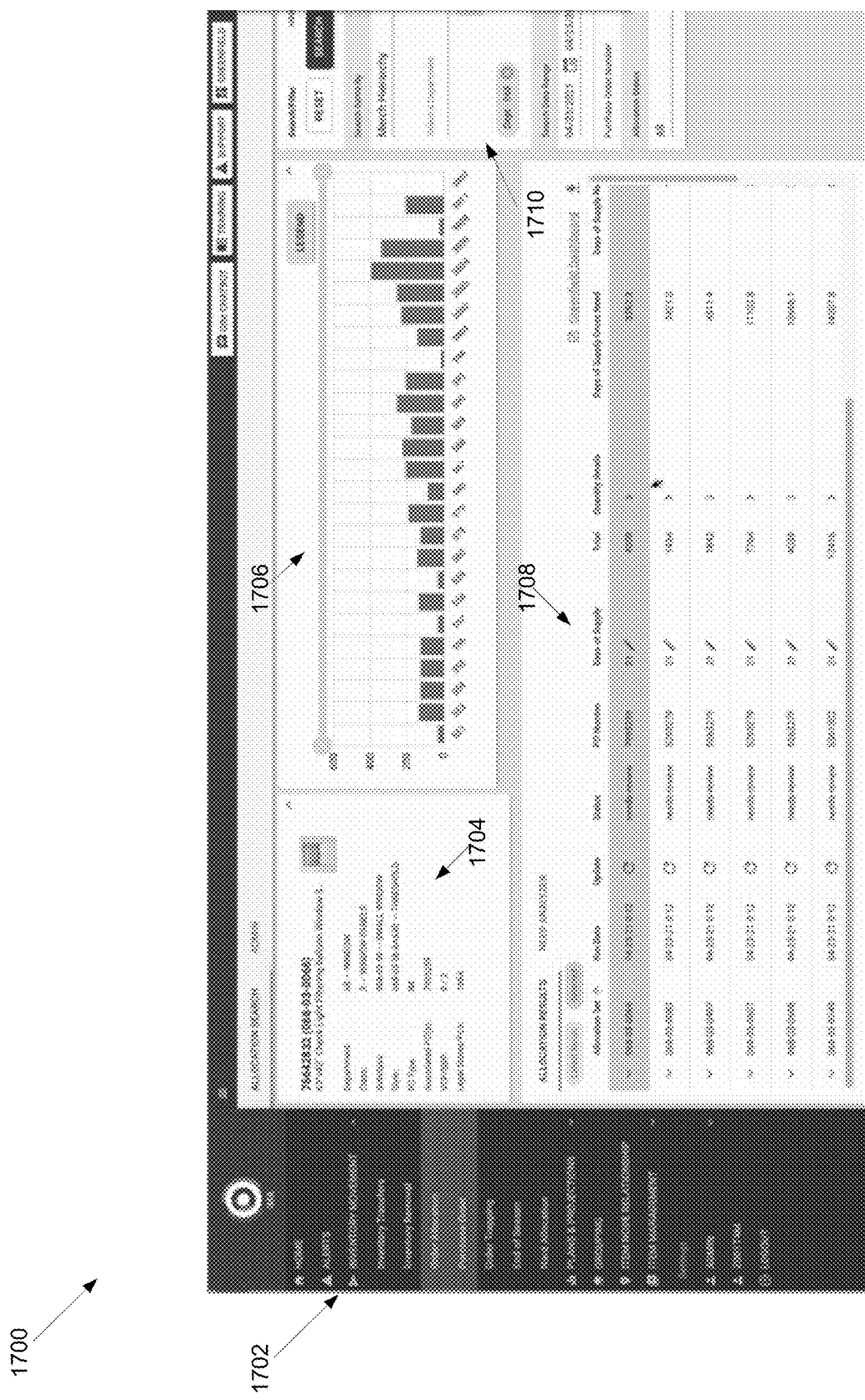
FIG. 17 illustrates an example interface for order allocation.

FIG. 8 illustrates a graphical view 800 that illustrates future supply chain events in detail on a per-epoch basis. In the example shown, an overall on-hand inventory level may be shown using a line graph, with both fulfilled and unfulfilled demand being illustrated alongside both scheduled shipments of items for replenishment at a particular location, as well as projected orders and projected shipments (based on projected purchase orders and lead time for the particular item that is the subject of the order). Based on the view of otherwise unfulfilled demand or deviation from desired operation, a purchase order may be issued or modified using the graphical view 800, similar to that of FIG. 6. In either instance, a user interface such as seen in FIG. 17 may be utilized.

Figure 9A:
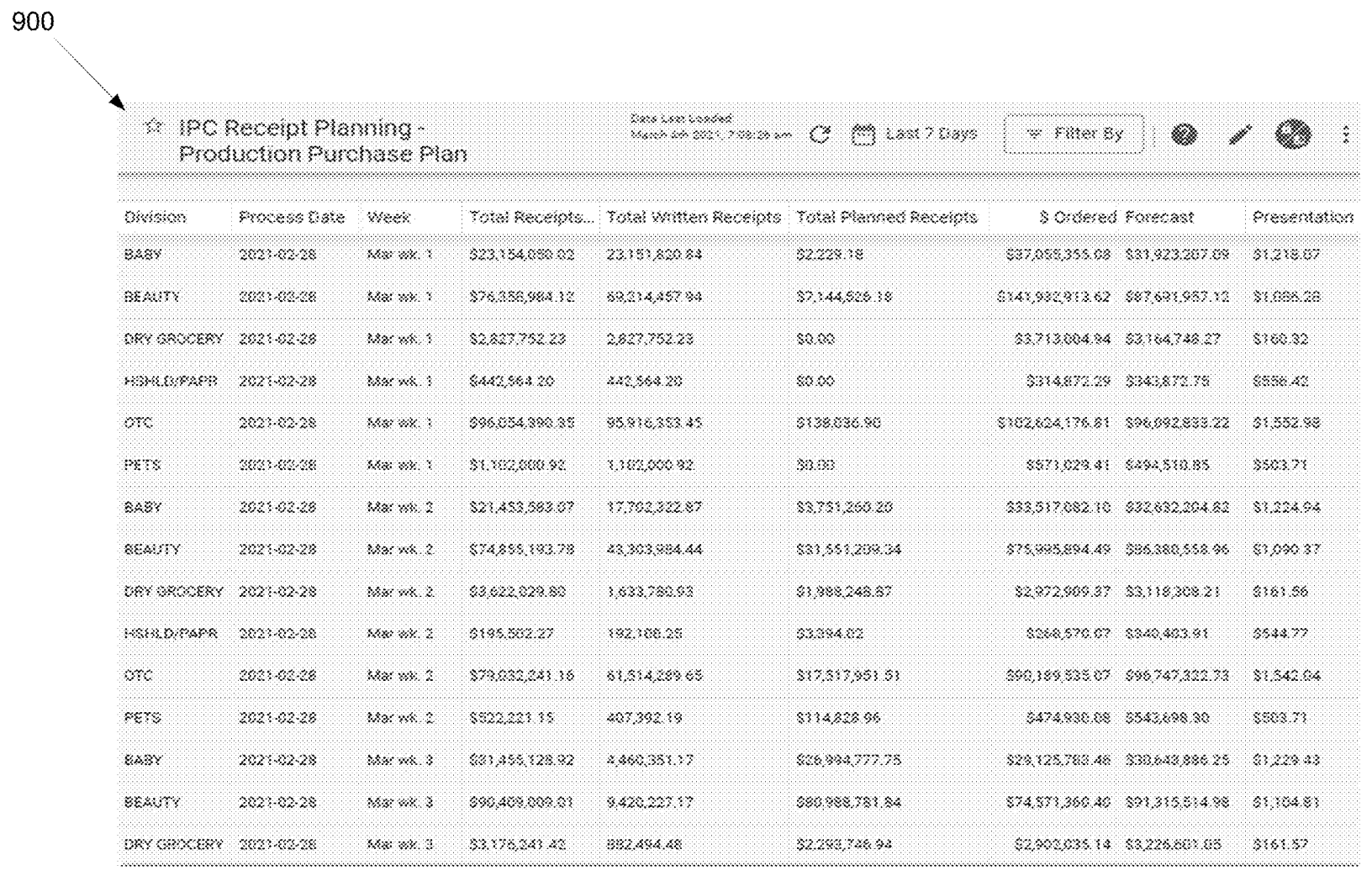
Figure 9B:
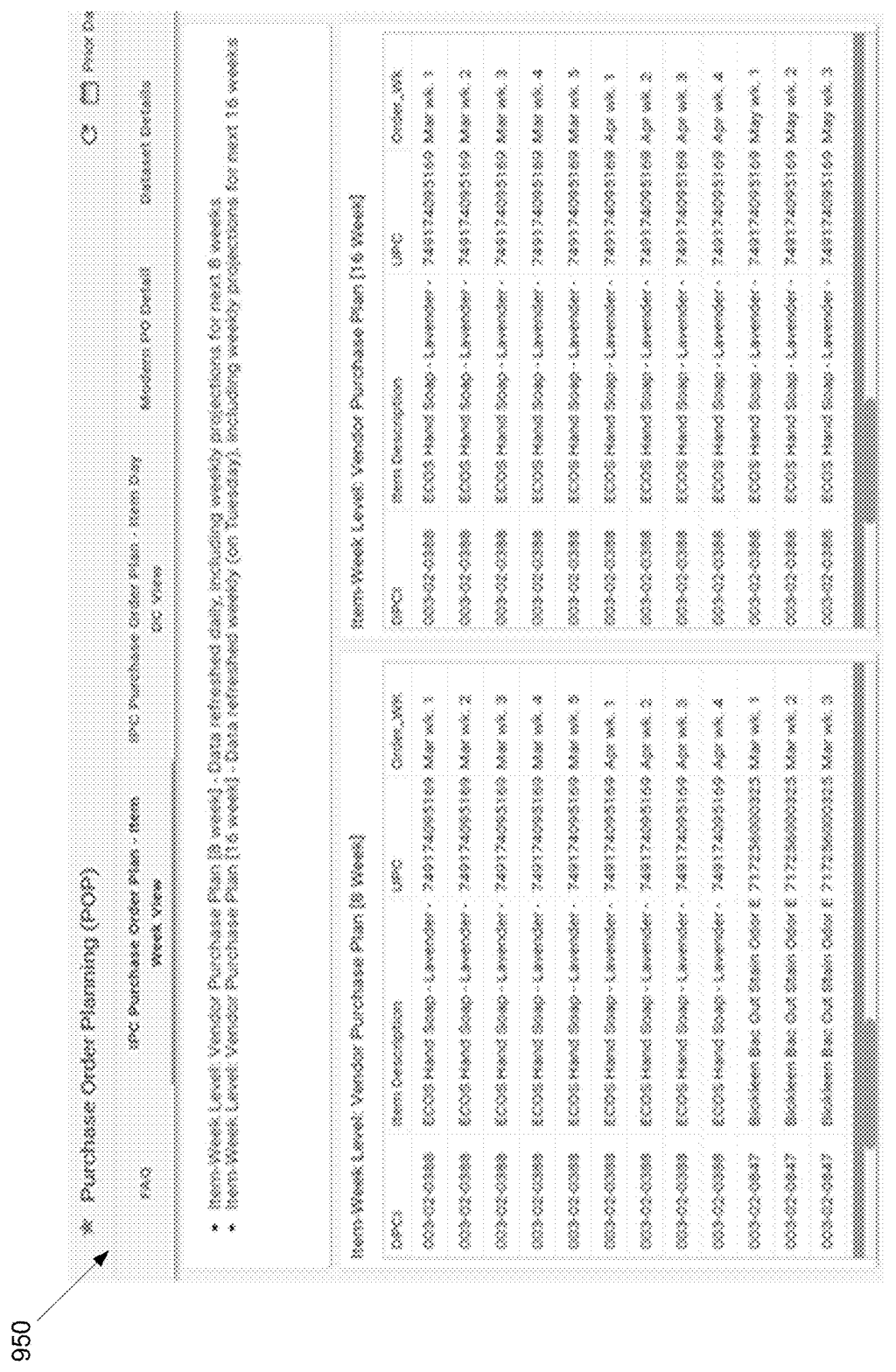

FIGS. 9A and 9B illustrate list user interfaces to provide summary information of a production purchase plan 900 and a purchase order plan 950, respectively. The production purchase plan user interface 900 presents a summary, by division and week, of total receipts, total written receipts, total planned receipts, dollar amount ordered, as well as forecasts for each division. The purchase order plan 950 provides a detailed week view of purchase orders for a given item.

Referring to FIG. 8 and FIGS. 9A-9B, it can be seen that various users, such as overall supervisory planners as well as division-level planners (in the case of the production purchase plan 900 for FIG. 9A) and suppliers (in the case of the purchase order plan 950 of FIG. 9B), can be concurrently presented with customized user interfaces tailored to that user, but based on the same underlying source of truth, so each individual within the enterprise operates based on the a common understanding of the current status of orders and/or supply chain status.

Figure 10:
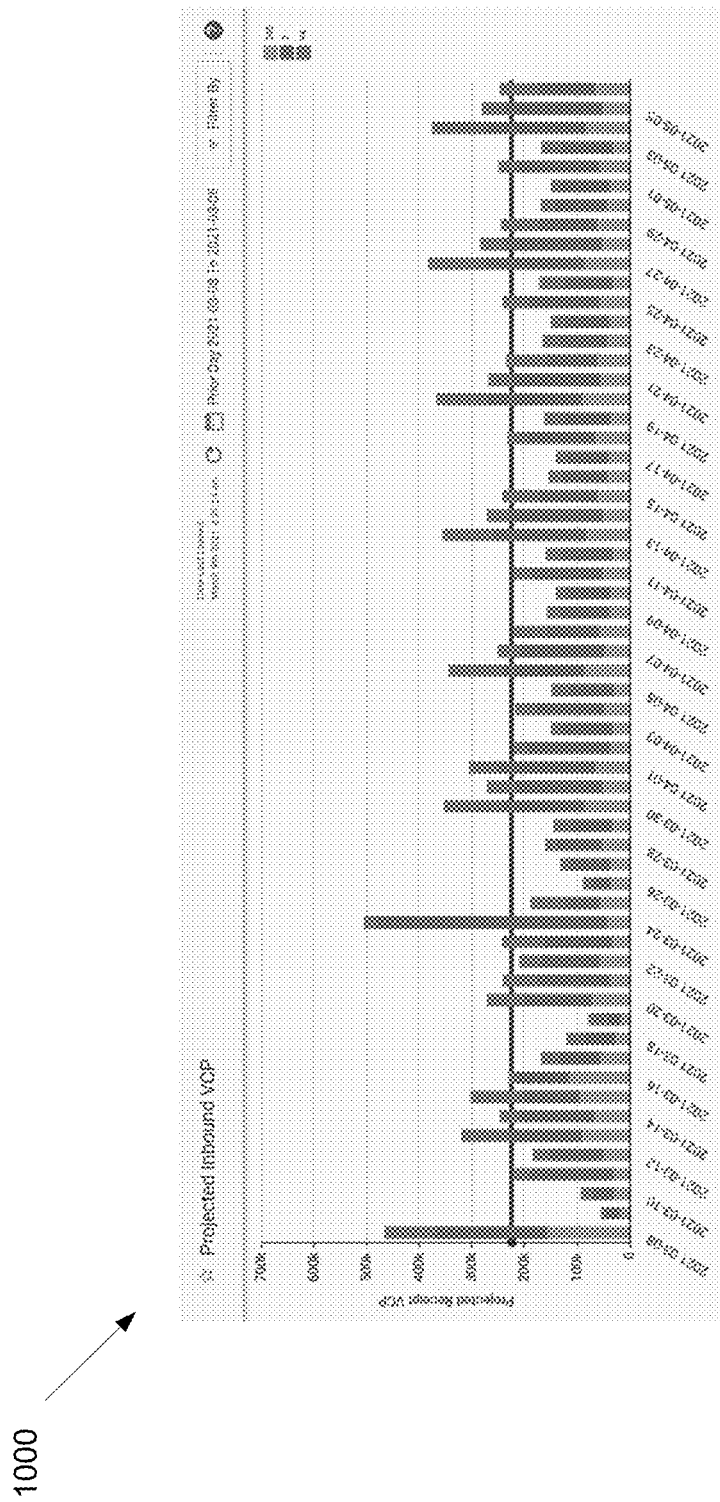
FIG. 10 illustrates an example graphical view presentable within a purchase plan application as described above in conjunction with FIGS. 6A-6B and FIG. 7, showing inbound projected item receipts.

FIG. 10 illustrates a further graphical view 1000 that may be presented within a user interface of a purchase planning application, in particular to display for capacity planning purposes expected receipt of items at a particular node, such as a warehouse or retail store. In this case, per-epoch expected item receipt may be displayed and compared against a threshold which represents an average number of items received which may be handled and stored at that node. By seeing particular days that are expected to be above or below that threshold, changes in personnel, space, and routing of items may be made to accommodate the future item receipts.

Figures 11A, 11B:
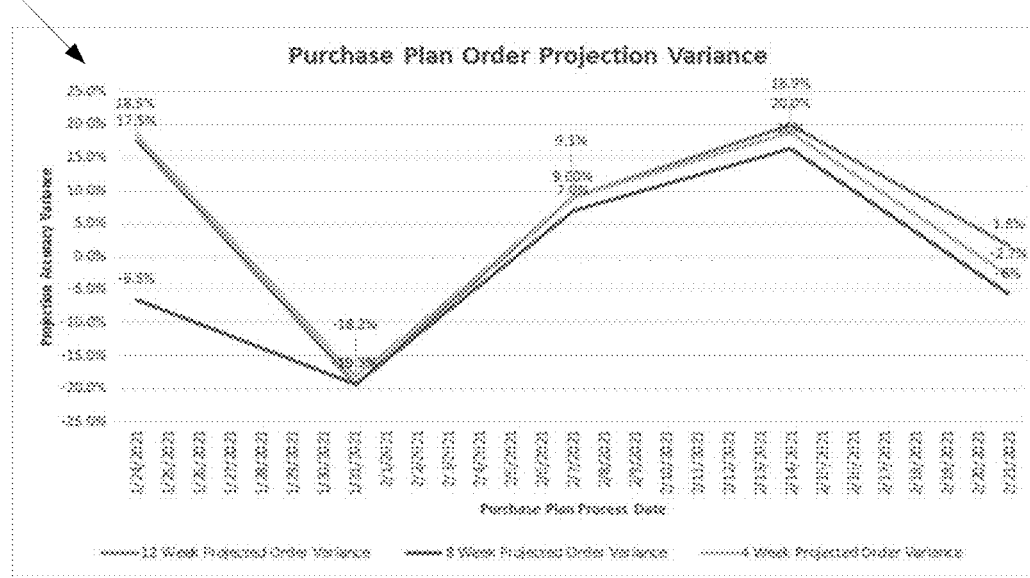
FIG. 11A illustrates an example graphical view presentable within a purchase plan application illustrating order projection variance as compared to actual supply chain operation.
FIG. 11B illustrates an example graphical view presentable within a purchase plan application illustrating receipt projection variance as compared to actual supply chain operation.

FIGS. 11A-11B are further graphical views that may be presented or derived from data within the purchase planning application. In FIG. 11A, a chart 1100 displays a variance from actual purchase order item quantities over time. For example, the actual purchase order volume may be compared to a projected purchase order volume for the same timeframe made 4 weeks prior, 8 weeks prior, 12 weeks prior, and the like, and deviations may be displayed to show how those earlier projections compare to the actual purchase order volumes. Similarly, in FIG. 11B, variance may be shown at Apr. 8, 2012 week projections from actual purchase plan items received, in a chart 1150.

Figure 12:
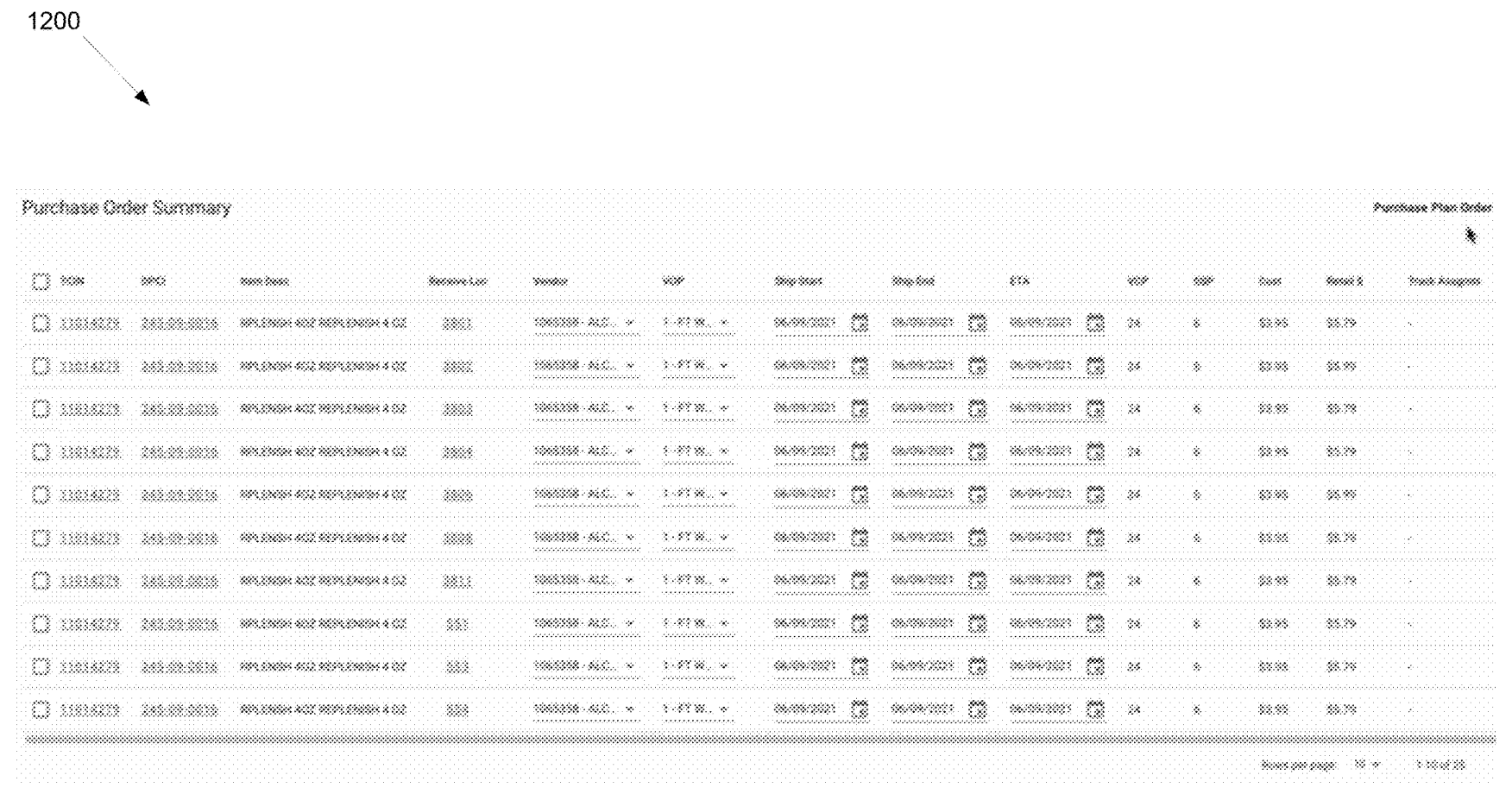

FIG. 12 illustrates an example user interface 1200 for a purchase order summary. In some examples, a user can navigate to the user interface 1200 to view a summary of purchase orders that have been issued, or which are otherwise scheduled or expected to occur. For example, in expected purchase orders (which have not yet been issued), a user can adjust the shipping date, the vendor, the quantity, the expected time of arrival for each purchase order on the user interface 1200. Accordingly, the scheduled purchase order may result in an update to the graphical interfaces described above, based on reorder of particular items, and may also be automatically issued at a time designated in the purchase order (e.g., by a user or based on a specific reorder point). Other details related to the purchase order are also presented on the user interface 1200.

Figure 13:
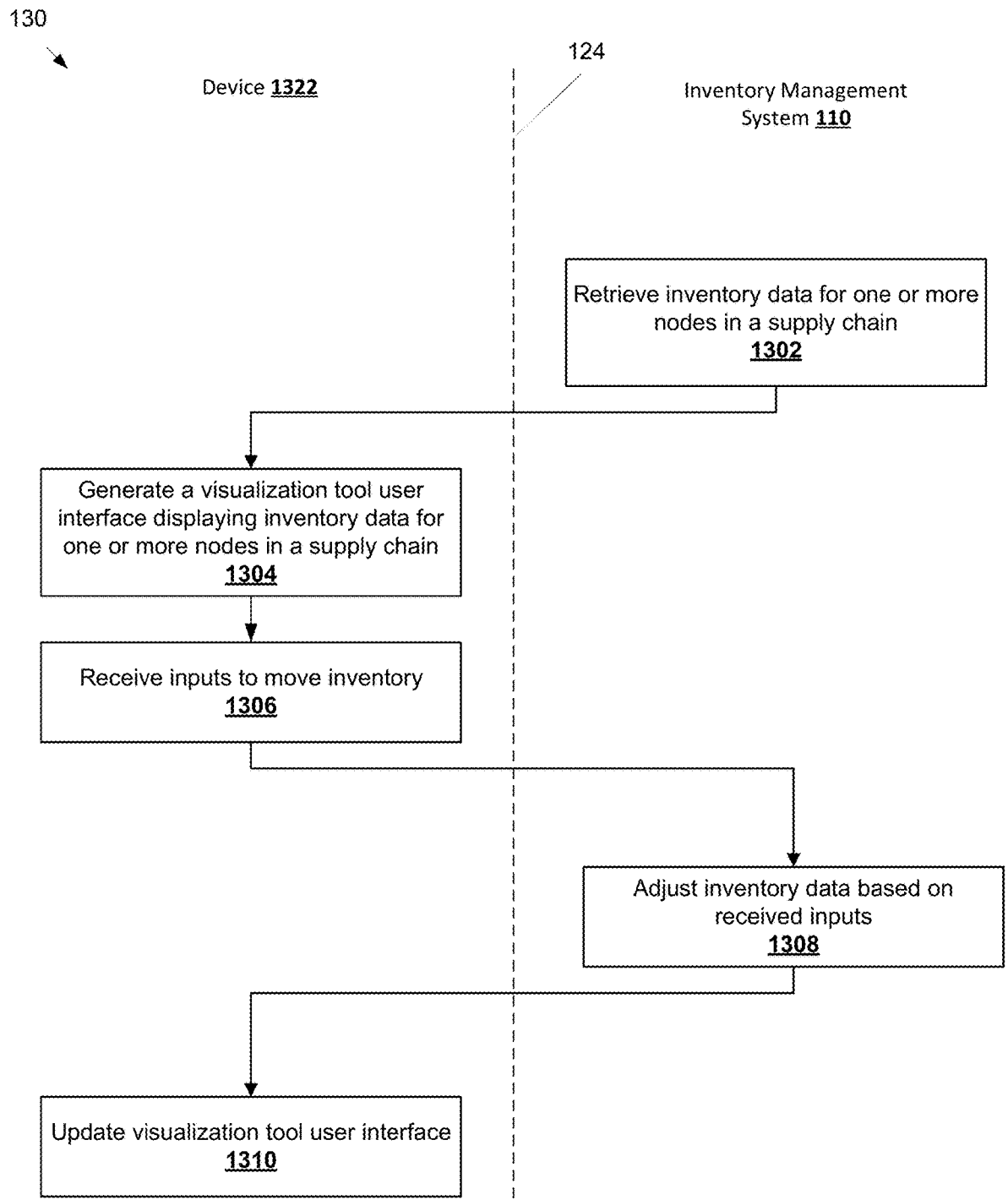
FIG. 13 illustrates an example method for using an inventory management system to transfer inventory within a supply chain.

FIG. 13 illustrates an example method 1300 for using an inventory management system to transfer inventory within a supply chain. In some examples, the method 1300 is performed using the inventory management system and a device 1322 (e.g., one of the devices 122 illustrated in FIG. 1), wherein the device 1322 and the inventory management system 100 are connected via the network 124. The method 1300 includes the operations 1302, 1304, 1306, 1308, and 1310.

In example embodiments, operation 1302 retrieves inventory data for one or more nodes in a supply chain. In some embodiments, the inventory data is stored in a data store. In some embodiments, the data includes a variety of information about the first mile coordination of items in the supply chain. In typical examples, the data includes the information required for the purchase plan system. In some embodiments, the inventory management system 100 retrieves the data from a data store and provide the data to the device 1322 via the network 124. In alternative embodiments, the device 1322 may retrieve the data directly.

In example embodiments, operation 1304 generates a visualization tool user interface displaying inventory data and/or inventory projections for one or more nodes in a supply chain. The visualization tool user interface is configured to receive user inputs to adjust and move inventory within a supply chain. Example user interfaces are illustrated and described in reference to FIGS. 14-18.

Figure 14:
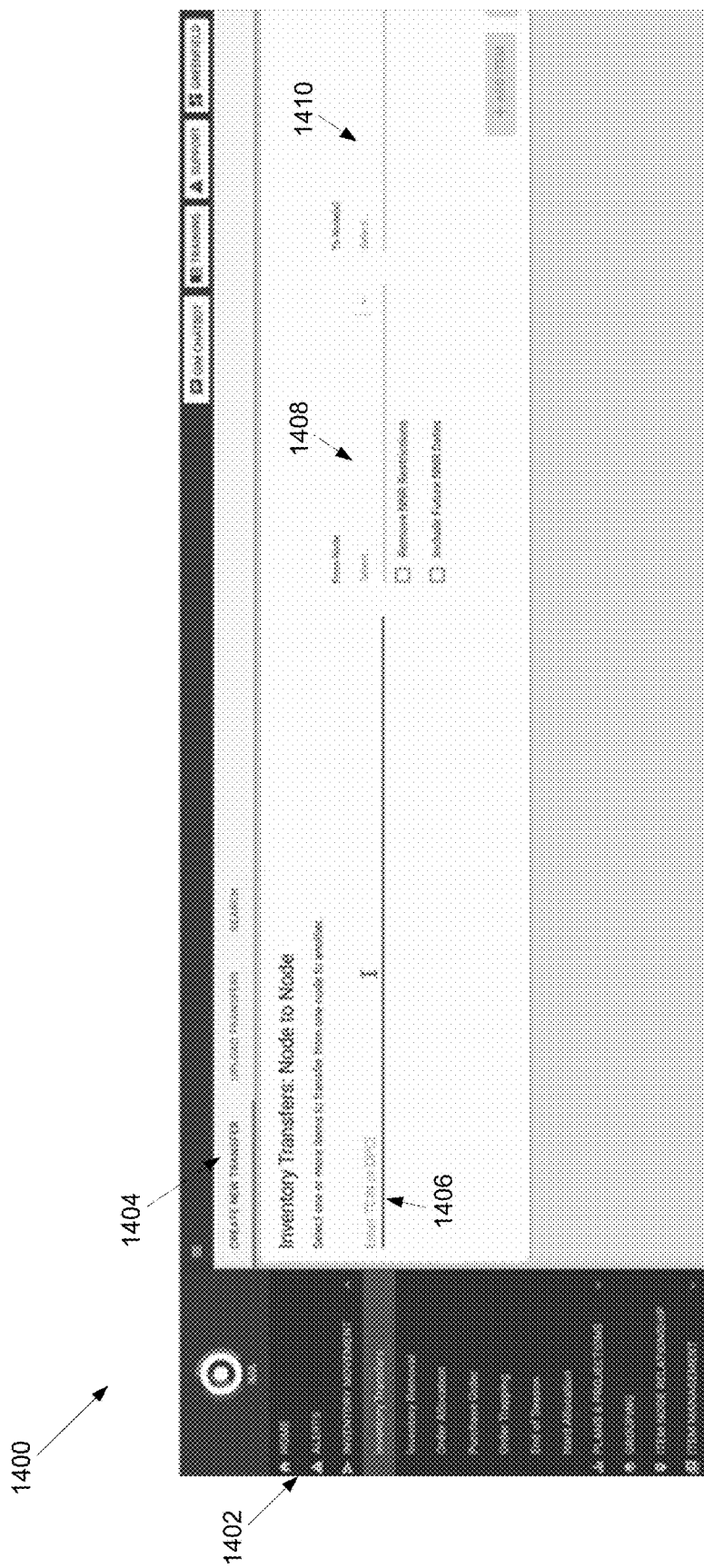
FIG. 14 illustrates an example user interface for making inventory transfers between nodes.
Figure 15:
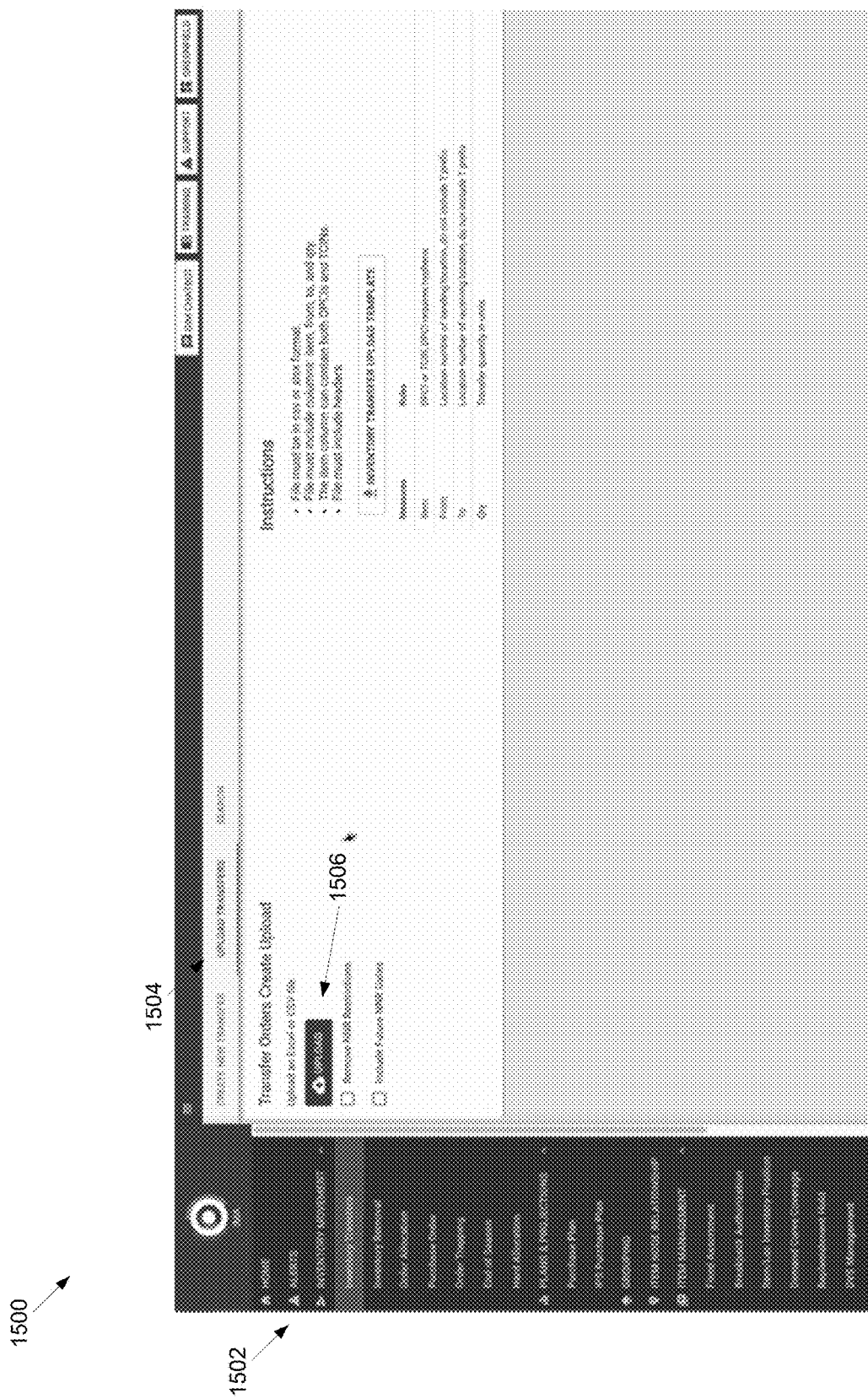
FIG. 15 illustrates an example user interface for uploading a document to make inventory transfers between nodes.

In example embodiments, operation 1306 receives inputs to move inventory between nodes in a supply chain. The inputs to move inventory may be received from a user, or may be received from a supply chain management system or simulation system. A variety of transfers and moves can be facilitated. For example, a node to node transfer to transfer a set of items between distribution centers, or among other nodes, may be facilitated. In other examples, a removal user interface presents item-based returns and allows management of removals and salvage operations occurring within a predetermined date range, for particular reasons or items, and at particular locations. Example user interfaces for moving inventory between nodes are illustrated in FIGS. 14 and 15.

In example embodiments, operation 1308 adjusts inventory data based on received inputs. The inventory data and projections are updated based on the inputs moving inventory within the supply chain. In some embodiments, the operation 1308 simulates the impact of different movements using the simulation system 106. In some embodiments, the operation 1308 is performed using the inventory management system 100. In alternative embodiments, the operation is performed on the device 1322.

The operation 1310 updates the visualization tool user interface. The visualization tool user interface is adjusted to reflect the adjusted inventory data and inventory projections. In some embodiments the user interface is adjusted in real time so a user can instantly view the overall impact of desired movements, e.g., automated orders, inventory rebalancing operations, and the like.

FIGS. 14-18 illustrate example user interfaces generated at a user device (e.g., the devices 122) using data aggregated and predictions generated by the inventory management system 100.

FIG. 14 illustrates an example user interface 1400 for making inventory transfers between nodes. The user interface 1400 includes a navigation interface 1402, a tab navigator 1404, an item ID field 1406, a source node field 1408, and a destination node field 1410. The navigation interface 1402 includes various tabs to navigate between different views with different features. The tab navigator 1404 includes different tabs for different views for entering node to node transfers. For example, the view shown in the user interface 1400 is the create new transfer view and the view shown in the user interface 1500 in FIG. 15 is the upload transfers. The item ID field 1406 receives inputs identifying an item or items to be moved between nodes. The source node field 1408 receives inputs which identify a node which has the item to be moved and the destination node field 1410 is the node which will receive the item. In some embodiments, the source node field 1408 will only include nodes which have the item.

FIG. 15 illustrates an example user interface 1500 for uploading a document to make inventory transfers between nodes. The user interface 1500 includes a navigation interface 1502, a tab navigator 1504, and a transfer document uploader 1506. Examples of the navigation interface 1502 and tab navigator 1504 are illustrated and described in reference to FIG. 14. The transfer document uploader 1506 is configured to upload a document with one or more transfer of items between nodes. In some embodiments, the document includes a required format such that the inventory management system can parse and process the transfer requests. In some embodiments, if the document is in a format which the inventory management is unable to process an error message is given to a user. In some embodiments, if a transfer request cannot be fulfilled an error message is delivered to the user.

Figure 16:
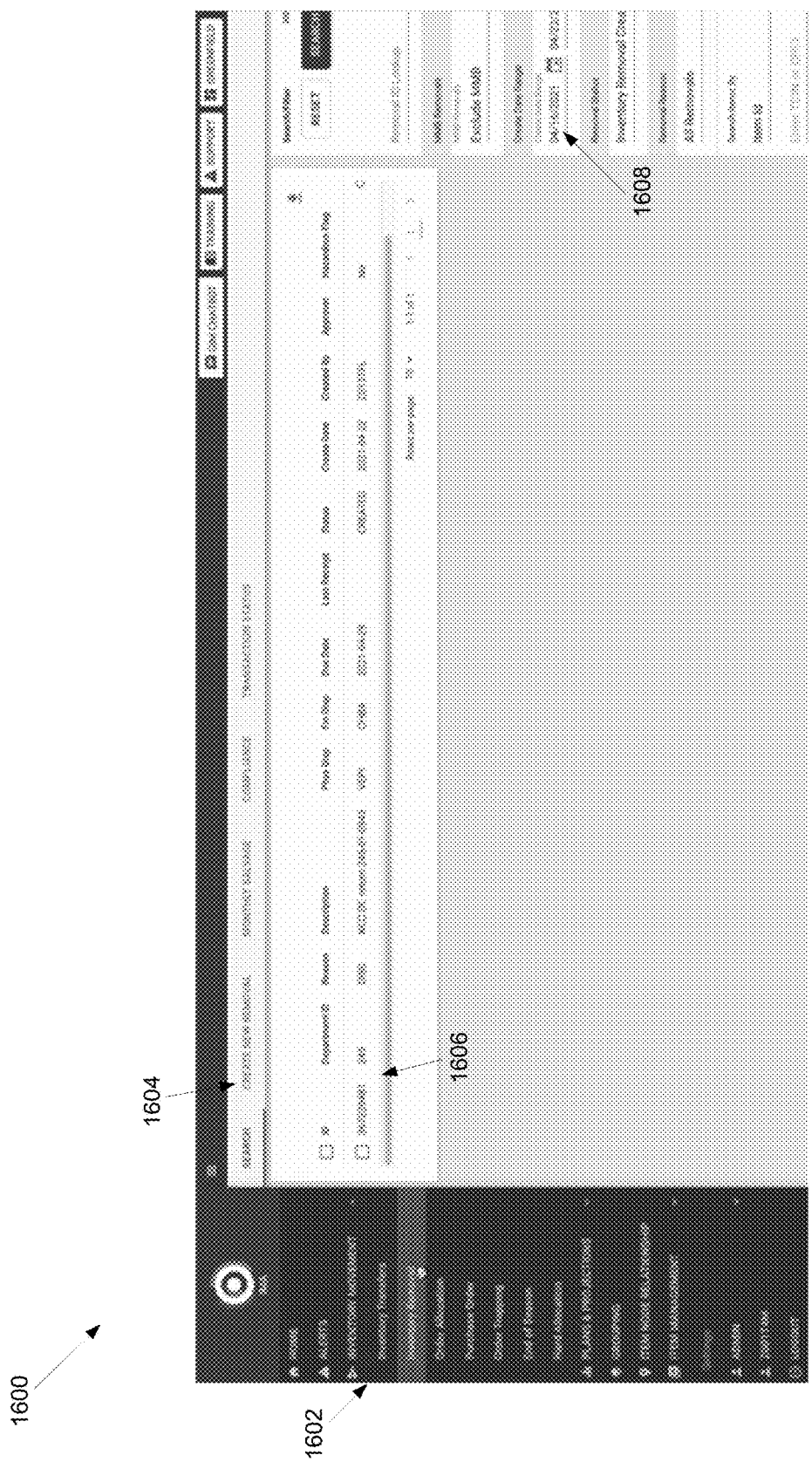
FIG. 16 illustrates an example user interface for inventory removal.

FIG. 16 illustrates an example user interface 1600 for inventory removal. The user interface 1600 presents item-based returns and allow management of removals and salvage operations. In some embodiments, the user interface 1600 allows for management of removals occurring within a predetermined date range. Additionally, the user interface 1600 a user to management removals for specific reasons (e.g., defects, returns), items, and/or locations.

The user interface 1600 include a navigation interface 1602 which is illustrated and described in conjunction with FIG. 14. The user interface 1600 also includes a tab navigator to which between different interfaces related to inventory removal. For example, interfaces to search items for removal, create a new removal, monthly salvage, compliance, and transaction status. The example user interface 1600 is in the search for items for removal with a search/filter interface 1608. The search for items uses the different search/filter fields in the search/filter interface 1608 and presents items in a search result table 1106 for removal.

FIG. 17 illustrates an example user interface 1700 for order allocation. The user interface 1700 includes a navigation interface 1702, a tab navigator 1704, allocation graphical view 1706, and allocation chart 1708 and a search/filter interface 1710. The user interface 1700 allows a user to search for a particular allocation of an item across supply chain nodes (e.g., distribution centers) for items that have been ordered and are in transit to warehouse after being received at a port.

Figure 18:
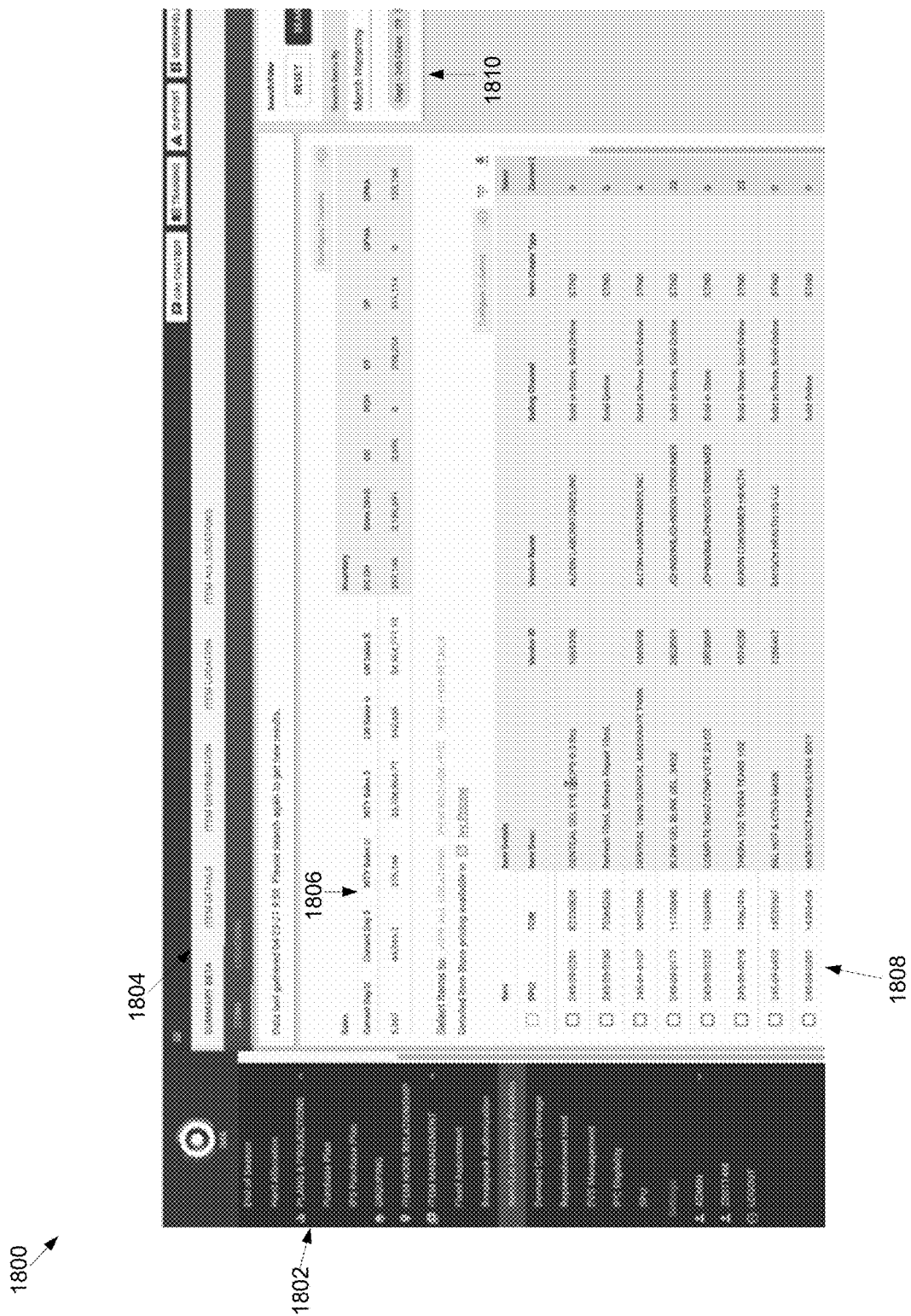
FIG. 18 illustrates an example user interface for displaying inventory data for an item.

FIG. 18 illustrates an example user interface 1800 for displaying inventory data for an item. The user interface 1800 includes a navigation interface 1802, a tab navigator 1804, item metrics 1806 including sales metrics for the item and inventory metrics for the item, an item chart 1808, and a search/filter interface 1810. The user interface 1800 allows for a use to search using the search/filter interface 1810 for a particular allocation of an item across a supply chain nodes. For example, the allocation of an item across distribution centers, ware houses, port, transit, etc.

Figure 19:
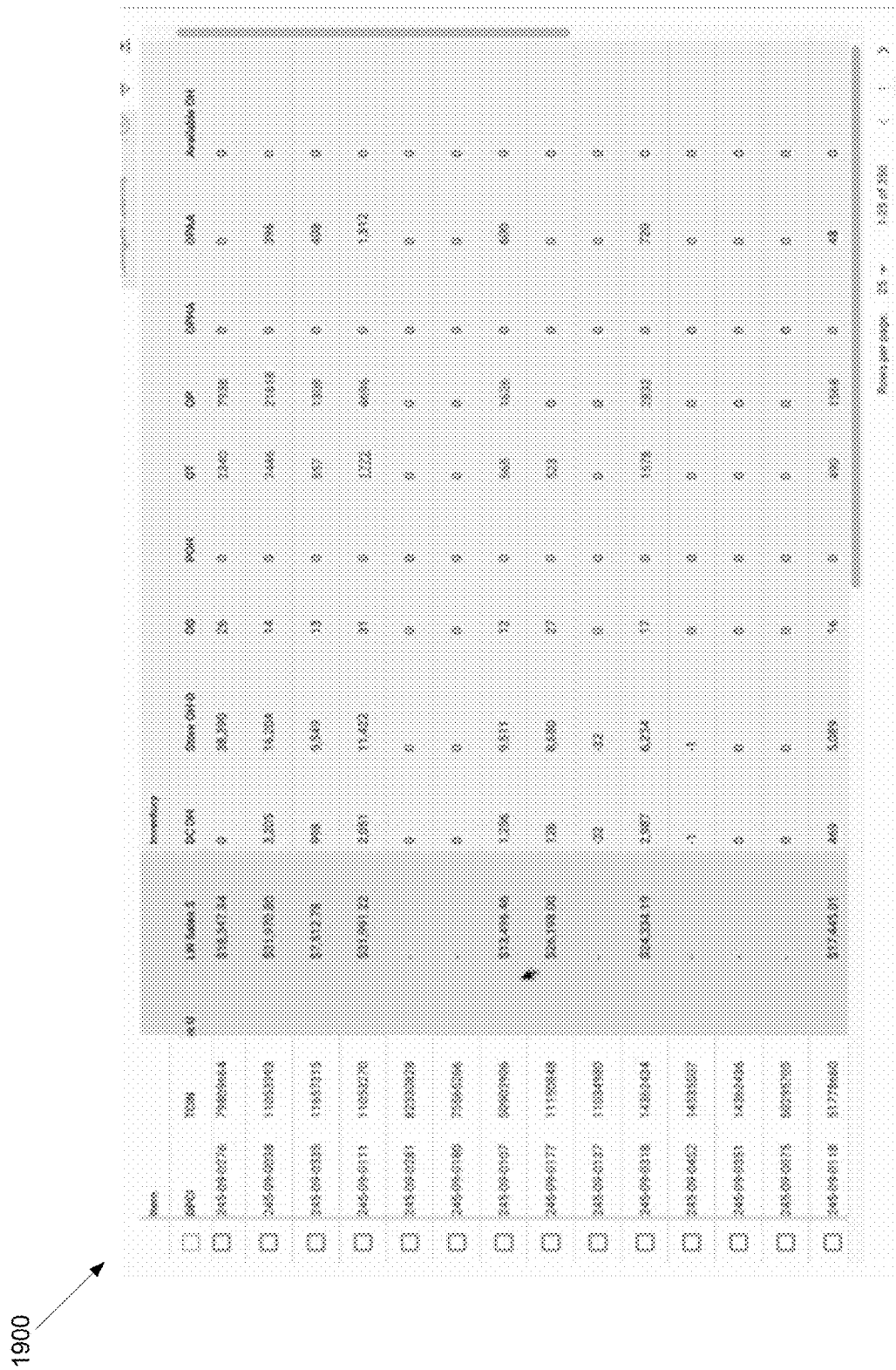
FIG. 19 illustrates an example item chart.

FIG. 19 illustrates an example item chart 1900. The item chart 1900 is another example of the item chart 1808 illustrated in FIG. 18. The example item chart 1900 shown includes item information and inventory information for the item at various nodes. In some embodiments, the item chart 1900 is generated to display an allocation of items across various nodes.

Figure 20:
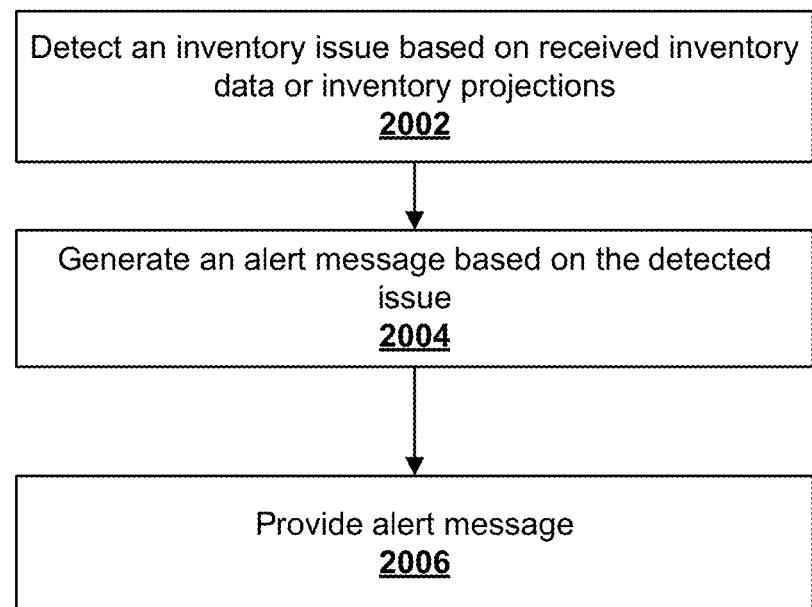
FIG. 20 illustrates an example method for detecting and providing an inventory alert.

FIG. 20 illustrates an example method 2000 for detecting and providing an inventory alert. In some embodiments, the method 2000 is performed using the inventory management system 100 which sends notifications of alerts to one or more user devices (e.g., the devices 122). In alternative embodiments, the method 2000 is performed on a user device (e.g., one of the devices 122). The method 2000 includes the operations 2002, 2004, and 2006.

In example embodiments, operation 2002 detects an inventory issue based on received inventory data or inventory projections. In some embodiments, specific alerts are detected to proactively see where problems arise. For example, the operation 2002 may detect a large amount of unfulfilled demand, item/location combinations with inadequate inventory, or which may result in out of stock or overstock conditions. In some embodiments, the alert is detected using the simulation system 106. In alternative embodiments, the alert is detected with one of or both of the inventory management system 100 and the purchase plan system 112.

In example embodiments, operation 2004 generates an alert message based on the detected issue. In some embodiments, a specific alert is detected and an associated description of the alert is used in the message. In addition, the alert message can includes information about the item, node/group of nodes, purchase order, dates, and other information related to the alert. In some embodiments, the alerts may include suggestions for possible actions to take to avoid the alert (e.g., schedule a purchase order or move inventory).

In example embodiments, operation 2006 provides an alert message to a user or as part of the visualization tool user interface. Examples of user interfaces for providing the alert message are illustrated and described in reference to FIGS. 21 and 22. In some embodiments, if a user makes a modification which results in an alert the user is notified in real time. For example, if a user enters a request to move inventory which will result in unfulfilled demand an alert may be generated and presented on the visualization tool user interface in real time. In some examples, the alerts are presented in one of the inventory management user interfaces, in others as part of the purchase plan user interfaces.

Figure 21:
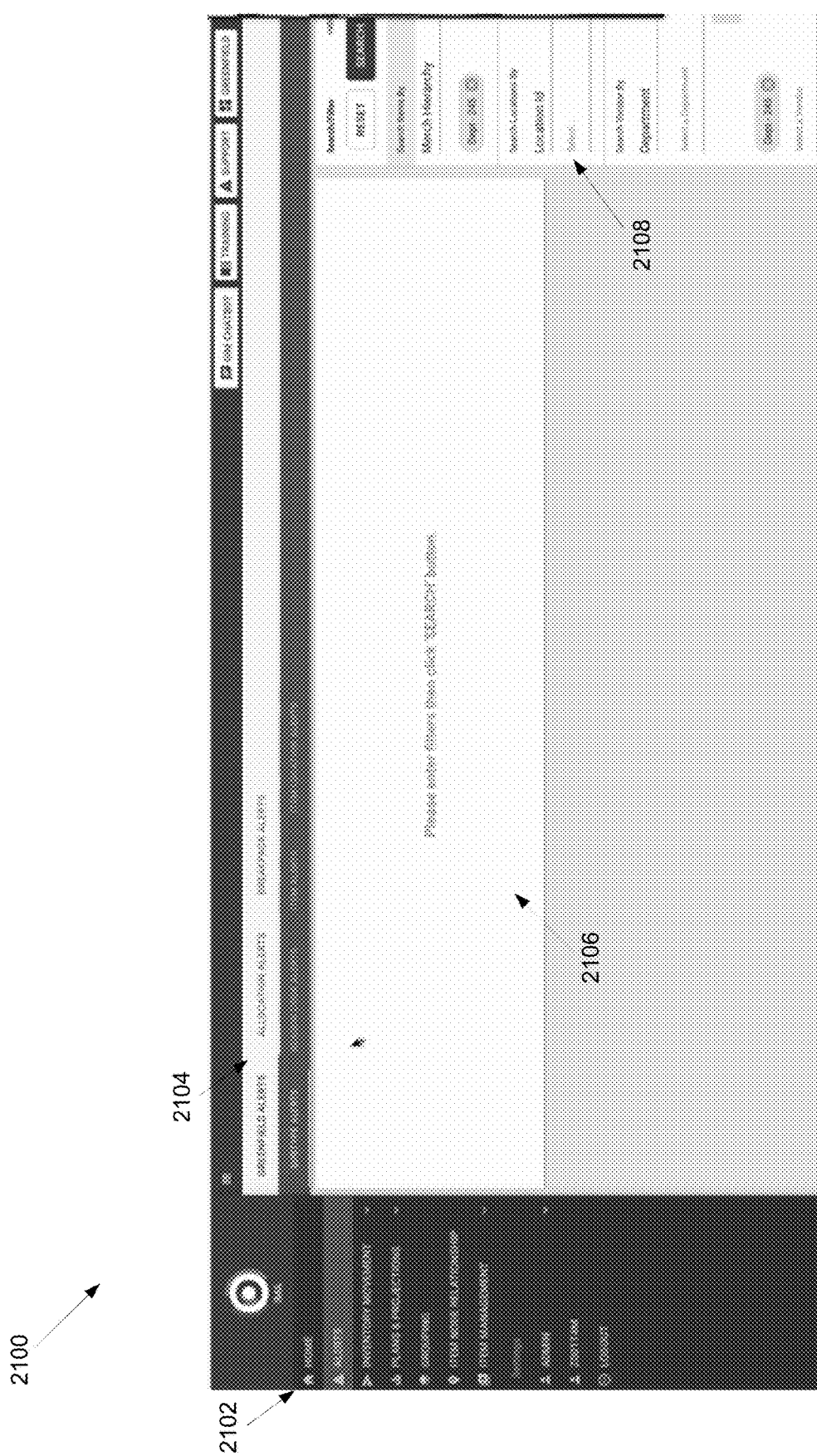
FIG. 21 illustrates an example user interface for presenting inventory alerts.

FIG. 21 illustrates an example user interface 2100 for presenting inventory alerts. The user interface 2100 includes a navigation interface 2102, a tab navigator 2104, an alert search result card 2106 which displays alerts returned from a search entered at the search filter interface 2108. For example, the alerts for an item, vendor, or node may be presented.

Figure 22:
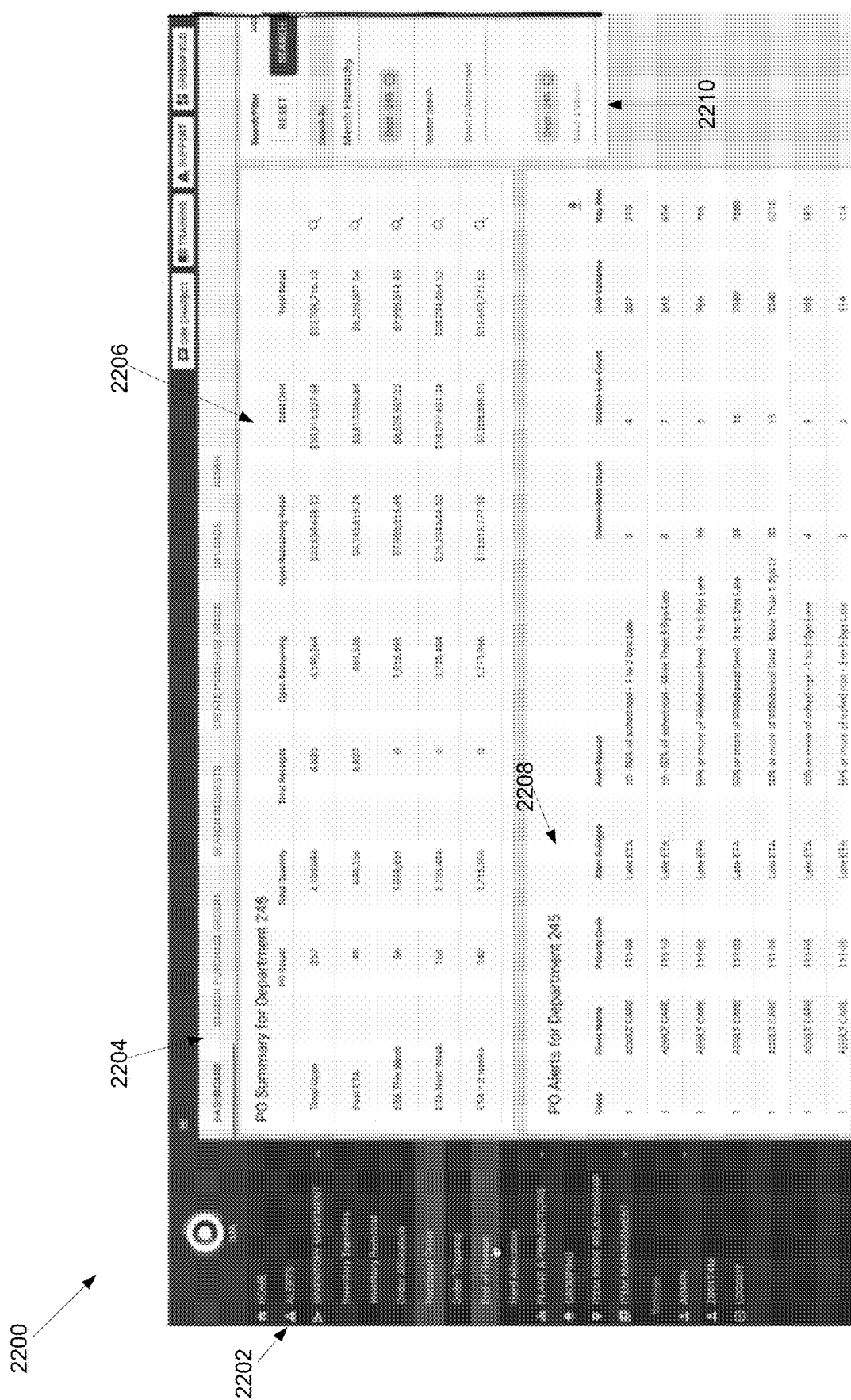
FIG. 22 illustrates an example user interface for presenting inventory alerts related to a purchase order.

FIG. 22 illustrates an example user interface 2200 for presenting inventory alerts related to a purchase order. The user interface 2200 includes a navigation interface 2202, a tab navigator 2204, a purchase order summary table 2206, a purchase order alerts table 2208 and a search/filter interface 2210.

In the example shown, the purchase order summary table 2206 displays a summary of outstanding purchase orders for the items, classes, locations, etc., defined in the search/filter interface 2210, e.g., for a particular location, department, or vendor. Additionally, the purchase order alerts table 2208 may display a variety of inventory alerts that may include, for example, alerts regarding deviation from expected operation of a supply chain, for example as actual items are received at different timing or quantity as compared to simulated/expected receipt based on simulation outputs or relative to vendor agreement. Additionally, higher than expected demand (e.g., outside a predetermined threshold) or other variance may be the basis of an alert.

Figure 23:
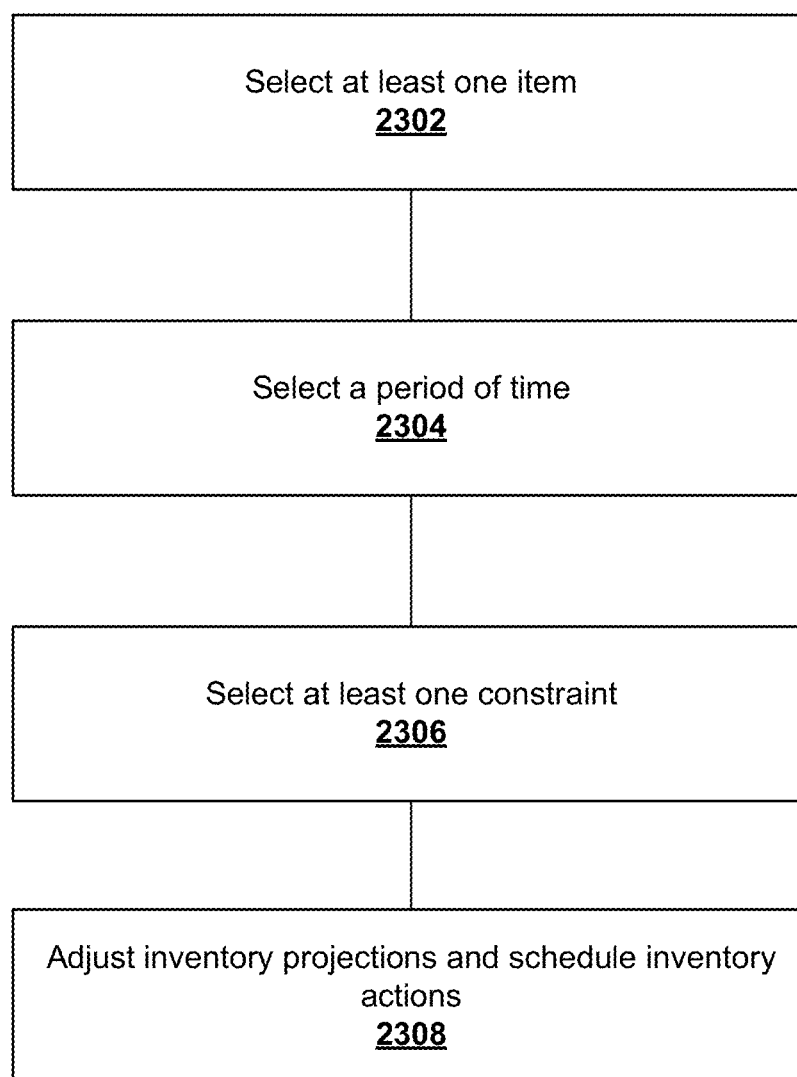
FIG. 23 illustrates an example method for adding constraint definitions to a purchase plan.

FIG. 23 illustrates an example method 2300 for adding constraint definitions to a purchase plan. In some embodiments, the constraint definitions limit one or more purchase orders. In some examples, the constraint definitions limit inventory movement. In some examples, the constraint definitions are given to the simulation system 106 which determines the outcomes based on the constraints. The method 2300 includes the operations 2302, 2304, 2306, 2308.

In example embodiments, operation 2302 selects at least one item. In some examples, a user selects at least one item which the constraint applies to. In some embodiments, a user can select a vendor or a node the constraint applies to. In some of these embodiments, all of the items at the selected node or from the selected vendor are selected. In some embodiments, no items are selected and the constraint is applied to all items (or all items of a certain type) within the supply chain. For example, the constraint may be constraining the minimum lead time for an item around busy times of the year for shipping, or a constraint as to particular days on which vendors may not receive purchase orders (e.g., due to holidays in vendor country of origin), which may affect lead time calculations.

In example embodiments, operation 2304 selects a period of time. In some embodiments, the constraint is applied for a period of time. The actions the constraint applies to within the period of time are simulated with the constraint and the action outside of the period of time will are simulated without the constraint. In some embodiments, the constraint is applied for an undefined period of time and will continue until a user selects a time to end the constraint.

In example embodiments, operation 2306 selects at least one constraint. In some embodiments, a user may define constraints on when a purchase order may be issued. For example, a vendor may not be able to process a new order during a particular time or week (e.g., a holiday period). In this example, the constraint is used to proactively generate purchase orders automatically in advance to ensure adequate supply is obtained prior to the unavailability. Other constraints include supply chain constraints (e.g., inbound capacity). In some embodiments, a vendor enters the constraint definitions. Other users which may enter constraint definitions include a supply chain analyst supply chain user or third party roles.

In example embodiments, operation 2308 adjusts inventory projections and schedule inventory actions (e.g., purchase orders, inventory transfers). In some examples, the inventory projections are updated on the constraints. In some examples, once a constraint is received the purchase orders are automatically adjusted or issued to avoid a supply chain issues, such as unfulfilled demand. In some embodiments, the updated inventory data, projections, and scheduled inventory actions are presented to a user in the visualization tool user interface.

Figure 24:
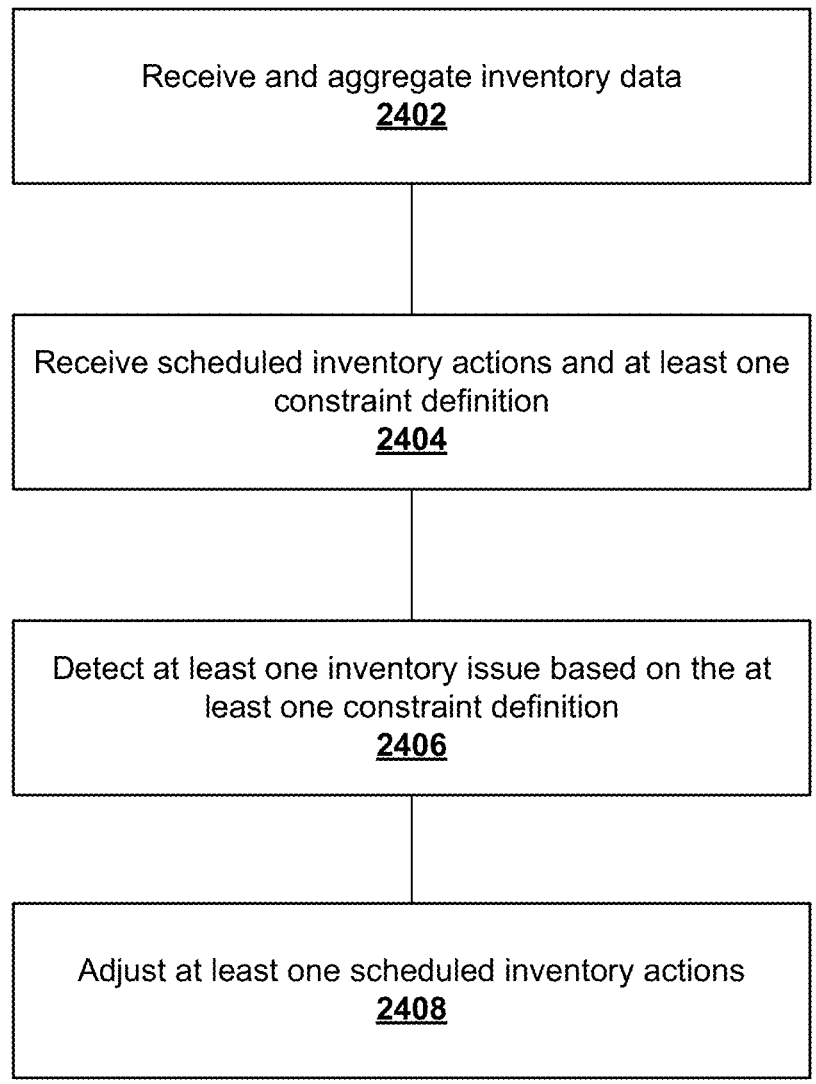
FIG. 24 illustrates an example method for applying a constraint definition in the inventory management application.

FIG. 24 illustrates an example method 2400 for applying a constraint definition in the inventory management application. The method 2400 includes the operation 2402, 2404, 2406, and 2408.

In example embodiments, operation 2402 receives and aggregates inventory data. In some embodiments, the inventory is stored in a data store. The inventory data is aggregated from a plurality of nodes in a retail enterprise. Examples of nodes are described herein.

In example embodiments, operation 2404 receives scheduled inventory actions and at least one constraint definition. In some embodiments, the scheduled inventory actions are stored in a data store. The inventory actions include inventory transfers (e.g., the transfer of items between nodes), removal of inventory, and purchase orders (including purchase orders which are automatically created and manually). In some embodiments, the constraint definition includes a period of time, at least one item and a constraint (e.g., a lead time constraint, a quantity constraint, etc.)

In example embodiments, operation 2406 detects at least one inventory issue based on the at least one constraint definition. Examples of constraint issues include an unfulfilled demand event, an out of stock event, and an over stock event. In some embodiments, the inventory issue also triggers an alarm. In some embodiments, the constraint issue includes detecting that the inventory of an item is not balanced appropriately across the supply chain. In some embodiments, the inventory issue is detected by providing the inventory data, the scheduled actions to the simulation system 106.

In example embodiments, operation 2408 adjusts at least one scheduled inventory action. For example, if an unfulfilled demand event is detected based on the impact of the constraint definition, then a new purchase order is automatically created to avoid the unfulfilled demand event. Other examples of modifications include adjusting the timing of a purchase order is modified, quantity of items in a purchase order, and/or issuing inventory transfer request (e.g., moving inventory between nodes). In some embodiments, the simulation system 106 is used to test different adjustments and determine an optimal adjustment or make a prediction of an optimal adjustment to the scheduled inventory actions. In some examples, adjustments to the scheduled inventory actions are sent to a user device (e.g., one of the devices 122). In some of these examples, a user interacting with the visualization tool user interface on a user device will be able to see the impact of the constraints in real time as the user enters the constraints.

The examples provided in FIGS. 1 through 24 are illustrated with specific systems, devices, processes, and user interfaces. Embodiments are not limited to environments according to these examples. Similar simulation for supply chain replenishment may be implemented in environments employing fewer or additional systems, devices, processes, and user interfaces. Furthermore, the example systems, devices, processes, and user interfaces shown in FIGS. 1 through 24 may be implemented in a similar manner with other values using the principles described herein.

Figure 25:
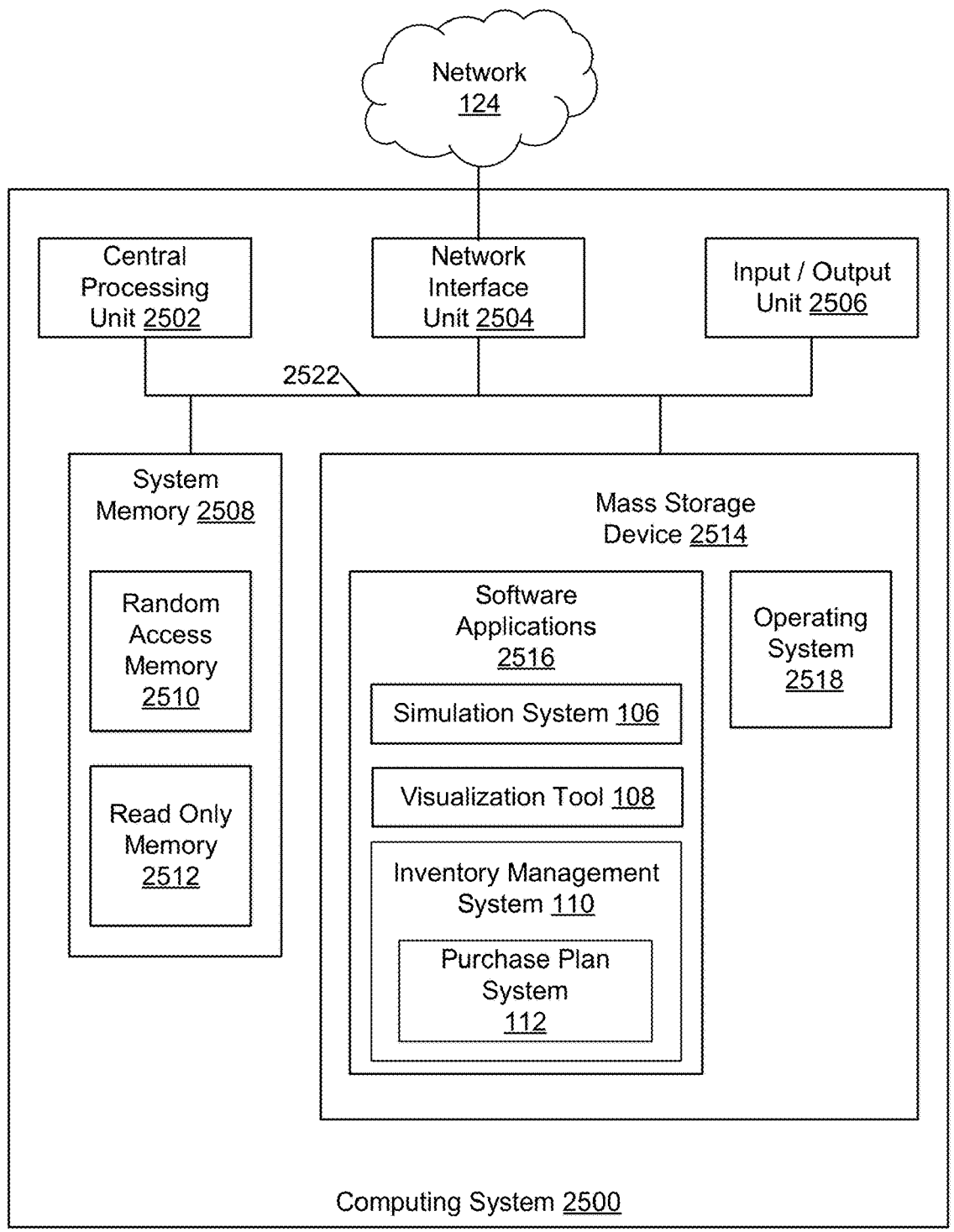
FIG. 25 illustrates an example block diagram of a computing system.

FIG. 25 illustrates an example block diagram of a computing system 2500. One or more aspects of the computing system 2500 can be used to implement the service 102, the simulation system 106, and the visualization tool 108, the inventory management system 100, and the purchase plan system 112 as described in greater detail with reference to FIG. 1.

In the embodiment shown, the computing system 2500 includes at least one CPU (Central Processing Unit) 2502, a system memory 2508, and a system bus 2522 that couples the system memory 2508 to the CPU 2502. The system memory 2508 includes RAM (Random Access Memory) 2510 and ROM (Read-Only Memory) 2512. A basic input/output system that contains the basic routines that help to transfer information between elements within the computing system 2500, such as during startup, is stored in the ROM 2512. The computing system 2500 further includes a mass storage device 2514. The mass storage device 2514 is able to store software instructions and data. In many examples, the one or more processors are each implemented as the at least one CPU 2502.

The mass storage device 2514 is connected to the CPU 2502 through a mass storage controller (not shown) connected to the system bus 2522. The mass storage device 2514 and its associated computer-readable data storage media provide non-volatile, non-transitory storage for the computing system 2500. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, DVD (Digital Versatile Discs), other optical storage media, magnetic cassettes, magnetic tape, magnetic disk storage or other magnetic storage devices, or any other medium which can be used to store the desired information and which can be accessed by the computing system 2500.

According to various embodiments of the invention, the computing system 2500 may operate in a networked environment using logical connections to remote network devices through the network 124. The computing system 2500 may connect to the network 124 through a network interface unit 2504 connected to the system bus 2522. It should be appreciated that the network interface unit 2504 may also be utilized to connect to other types of networks and remote computing systems. The computing system 2500 also includes an input/output unit 2506 for receiving and processing input from a number of other devices, including a touch user interface display screen, or another type of input device. Similarly, the input/output unit 2506 may provide output to a touch user interface display screen or other type of output device.

As mentioned briefly above, the mass storage device 2514 and the RAM 2510 of the computing system 2500 can store software instructions and data. The software instructions include an operating system 2518 suitable for controlling the operation of the computing system 2500. The mass storage device 2514 and/or the RAM 2510 also store software instructions, that when executed by the CPU 2502, cause one or more of the systems, devices, or components described herein to provide functionality described herein. For example, the mass storage device 2514 and/or the RAM 2510 can store software instructions that, when executed by the CPU 2502, cause the computing system 2500 (1) to receive and execute processes of the simulation system 106 for simulating replenishment within a supply chain network; (2) execute processes of the visualization tool 108 for displaying projected item inventory positions based on replenishment simulation output the scheduled purchase orders, or the scheduled inventory; (3) receive and execute processes of the inventory management system 100; and (4) receive and execute processes of the purchase plan system 112.

Referring to FIGS. 1-25 generally, the purchase order planning application and user interface described herein provides a number of advantages over existing systems. For example, by integrating forecast and actual purchases, and integrating expected demand for each item on a per-item, per-node basis within the supply chain, various users in an enterprise may view the same data concurrently from different perspectives, and may directly modify supply chain operations, such as automated generation of purchase orders or movements of items within a supply chain network. Still further, as changes are made at the item and location level for future purchase order plans, aggregate effects may be recalculated to present a supply-chain-wide effect of such changes. This provides significant "upstream" visibility through display of simulated and planned demand and order events that would otherwise not be made available in an integrated tool showing actual purchase orders and supply chain movements. Furthermore, purchasing plan forecasts may be compared against actual purchase orders and/or item levels to assess accuracy of forecasts. Additionally, simulated purchase order and supply chain movement events may be directly integrated with purchase order issuance and supply chain management systems, thereby providing a direct connection from simulation user interfaces through to other enterprise software systems, thereby triggering supply chain operations by way of straightforward user interface manipulation.

While particular uses of the technology have been illustrated and discussed above, the disclosed technology can be used with a variety of data structures and processes in accordance with many examples of the technology. The above discussion is not meant to suggest that the disclosed technology is only suitable for implementation with the data structures shown and described above. For examples, while certain technologies described herein were primarily described in the context of purchase plan user interfaces and supply chain system simulation, technologies disclosed herein are applicable to supply chain management generally.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., operations, memory arrangements, etc.) described with respect to the figures herein are not intended to limit the technology to the particular aspects described. Accordingly, additional configurations can be used to practice the technology herein and/or some aspects described can be excluded without departing from the methods and systems disclosed herein.

Similarly, where operations of a process are disclosed, those operations are described for purposes of illustrating the present technology and are not intended to limit the disclosure to a particular sequence of operations. For example, the operations can be performed in differing order, two or more operations can be performed concurrently, additional operations can be performed, and disclosed operations can be excluded without departing from the present disclosure. Further, each operation can be accomplished via one or more sub-operations. The disclosed processes can be repeated.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

The invention claimed is:

1. A method for visualizing an inventory management and control for a retail enterprise, the method comprising:
receiving and aggregating inventory data from a plurality of nodes of the retail enterprise;
scheduling a plurality of purchase orders for at least one item type based on the inventory data;
executing a first simulation to generate projected inventory levels for the at least one item type based on the inventory data and the plurality of purchase orders;
rendering on a display, as part of a visualization tool user interface, a single graph that displays, over time, past demand for the at least one item type, past inventory levels for the at least one item type, current inventory levels for the at least one item type, the plurality of purchase orders for the at least one item type, projected inventory levels for the at least one item type, and projected fulfilled and unfulfilled demand for the at least one item type, wherein the single graph displays a purchase order on a horizontal axis of the single graph at a time when the purchase order is to be automatically executed, and wherein the past demand is visually separated by a fulfilled past demand represented by a first color and an unfulfilled past demand represented by a second color, the second color being brighter than the first color;
receiving, via the visualization tool user interface, an input adjusting at least one purchase order of the plurality of purchase orders by at least performing:
displaying a chart that displays the purchase order and includes a column corresponding to a time for the purchase order; and
receiving, in a date selection field located in the column corresponding to the time for the purchase order, a modification of the time when the purchase order is to be automatically executed;
in response to receiving the input, automatically executing a second simulation using a modified time when the purchase order is to be automatically executed received via the date selection field to generate updated projected inventory levels for the at least one item type and to generate updated projected fulfilled and unfulfilled demand for the at least one item type;
dependent on the second simulation, updating the single graph in real time to display the updated projected inventory levels for the at least one item type, to display the updated projected fulfilled and unfulfilled demand for the at least one item type, and to display the purchase order on the horizontal axis of the single graph at the modified time when the purchase order is to be automatically executed; and
automatically generating and displaying an alert in the visualization tool user interface in response to determining, based on updated inventory data received from the plurality of nodes, that an actual inventory level deviates from the updated projected inventory levels determined by executing the second simulation using the modified time when the purchase order is to be automatically executed.

2. The method of claim 1, wherein the input adjusting the at least one purchase order includes adjusting one of:
(1) a timing of the at least one purchase order;
(2) a quantity of the at least one item type in the at least one purchase order;
(3) a constraint of the at least one item type in the at least one purchase order, and
(4) adding an additional purchase order to the plurality of purchase orders.

3. The method of claim 1, wherein at least one node of the plurality of nodes is a distribution center.

4. The method of claim 1, wherein the inventory data includes projected orders and projected item receipts corresponding to the plurality of purchase orders.

5. The method of claim 1, the method further comprising:
receiving inputs selecting a frequency for aggregating the inventory data, wherein the inventory data is aggregated based on the frequency.

6. The method of claim 5, wherein the frequency for aggregating the inventory data is one of daily, weekly, and hourly.

7. The method of claim 1, the method further comprising:
calculating at least one of a projected revenue and a projected profit based on the projected fulfilled and unfulfilled demand for the at least one item type.

8. The method of claim 1, wherein the projected inventory levels for the at least one item are updated in real-time on the single graph as the inputs adjusting the at least one purchase order are received.

9. The method of claim 1, the method further comprising:
receiving additional inputs which define a constraint, wherein the constraint limits at least one constrained purchase order of the plurality of purchase orders; and
adjusting at least one other purchase orders of the plurality of purchase orders based on the constraint.

10. The method of claim 9, wherein adjusting the at least one other purchase order includes increasing a quantity of the at least one item type in the at least one other purchase order in advanced of the at least one constrained purchase order.

11. The method of claim 9, wherein the adjusting the at least one other purchase order is done automatically.

12. The method of claim 1, the method further comprising:
based on the updated projected inventory levels generated by the simulation, identifying a projected stockout event based on the updated projected inventory levels being lower than a projected demand for the at least one item type; and
displaying, as part of the visualization tool user interface, an alert for the projected stockout event.

13. The method of claim 1, the method further comprising:
receiving movement inputs to move a plurality of items of the at least one item type between nodes of the plurality of nodes; and
updating, automatically, the inventory data based on the movement inputs.

14. The method of claim 1, wherein the group of nodes represents a geographical region.

15. An inventory management and control system comprising:
at least one processor;
at least one memory storage device, the memory storage device storing instructions which when executed by the at least one processor cause the inventory management and control system to:
receive and aggregate inventory data from a plurality of nodes of a retail enterprise;
schedule a plurality of purchase orders for at least one item type based on the inventory data;
execute a first simulation to generate projected inventory levels for the at least one item type based on the inventory data and the plurality of purchase orders;
render on a display, as part of a visualization tool user interface, a single graph that displays, over time, past demand for the at least one item type, past inventory levels for the at least one item type, current inventory levels for the at least one item type, the plurality of purchase orders for the at least one item type, projected inventory levels for the at least one item type, and projected fulfilled and unfulfilled demand for the at least one item type, wherein the single graph displays a purchase order on a horizontal axis of the single graph at a time when the purchase order is to be automatically executed, and wherein the past demand is visually separated by a fulfilled past demand represented by a first color and an unfulfilled past demand represented by a second color, the second color being brighter than the first color;
receive, via the visualization tool user interface, an input adjusting at least one purchase order of the plurality of purchase orders by at least performing:
displaying a chart that displays the purchase order and includes a column corresponding to a time for the purchase order; and
receiving, in a date selection field located in the column corresponding to the time for the purchase order, a modification of the time when the purchase order is to be automatically executed;
in response to receiving the input, automatically execute a second simulation using a modified time when the purchase order is to be automatically executed received via the date selection field to generate updated projected inventory levels for the at least one item type and to generate updated projected fulfilled and unfulfilled demand for the at least one item type; and
dependent on the second simulation, update the single graph in real time to display the updated projected inventory levels for the at least one item type, to display the updated projected fulfilled and unfulfilled demand for the at least one item type, and to display the purchase order on the horizontal axis of the single graph at the modified time when the purchase order is to be automatically executed.

16. The inventory management and control system of claim 15, wherein the instructions, when executed by the at least one processor, further cause the inventory management and control system to:
receive additional inputs which define a constraint, wherein the constraint limits at least one constrained purchase order of the plurality of purchase orders; and
adjust at least one other purchase orders of the plurality of purchase orders based on the constraint.

17. The inventory management and control system of claim 16, wherein to adjust the at least one other purchase order includes to increase a quantity of the at least one item type in the at least one other purchase order in advanced of the at least one constrained purchase order.

18. The inventory management and control system of claim 16, wherein to adjust the at least one other purchase order is done automatically.

19. One or more non-transitory computer-readable storage devices storing data instructions that, when executed by at least one processing device cause the at least one processing device to:
receive and aggregate inventory data from a plurality of nodes of a retail enterprise;
schedule a plurality of purchase orders for at least one item type based on the inventory data;
execute a first simulation to generate projected inventory levels for the at least one item type based on the inventory data and the plurality of purchase orders;

render on a display, as part of a visualization tool user interface, a single graph that displays, over time, past demand for the at least one item type, past inventory levels for the at least one item type, current inventory levels for the at least one item type, the plurality of purchase orders for the at least one item type, projected inventory levels for the at least one item type, and projected fulfilled and unfulfilled demand for the at least one item type, wherein the single graph displays a purchase order on a horizontal axis of the single graph at a time when the purchase order is to be automatically executed;

receive, via the visualization tool user interface, an input adjusting at least one purchase order of the plurality of purchase orders by at least performing:

displaying a chart that displays the purchase order and a date selection field corresponding to a time for the purchase order; and receiving, in the date selection field, a modification of the time when the purchase order is to be automatically executed;

in response to receiving the input, automatically execute a second simulation using a modified time when the purchase order is to be automatically executed received via the date selection field to generate updated projected inventory levels for the at least one item type and to generate updated projected fulfilled and unfulfilled demand for the at least one item type; and dependent on the second simulation, update the single graph to display the updated projected inventory levels for the at least one item type, to display the updated projected fulfilled and unfulfilled demand for the at least one item type, and to display the purchase order on the horizontal axis of the single graph at the modified time when the purchase order is to be automatically executed.

* * * * *